(12) United States Patent
Sunahara et al.

(10) Patent No.: US 7,815,094 B2
(45) Date of Patent: Oct. 19, 2010

(54) METHOD OF MANUFACTURING CYLINDRICAL BODY, AND FRICTION STIR WELDING METHOD

(75) Inventors: Shunsuke Sunahara, Sayama (JP); Haruo Machida, Saitama-ken (JP); Yuu Igarashi, Tochigi-ken (JP); Tadashi Goto, Hidaka (JP); Toshimasa Koshimizu, Tochigi-ken (JP); Hideo Nakamura, Sakado (JP); Satoru Morita, Hamamatsu (JP); Taisei Wakisaka, Tochigi-ken (JP); Kei Kuriyama, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 828 days.

(21) Appl. No.: 10/537,180

(22) PCT Filed: Dec. 5, 2003

(86) PCT No.: PCT/JP03/15598

§ 371 (c)(1),
(2), (4) Date: Dec. 30, 2005

(87) PCT Pub. No.: WO2004/052585

PCT Pub. Date: Jun. 24, 2004

(65) Prior Publication Data

US 2006/0163327 A1    Jul. 27, 2006

(30) Foreign Application Priority Data

| Dec. 6, 2002 | (JP) | ............... 2002-354864 |
| Apr. 11, 2003 | (JP) | ............... 2003-107717 |
| Jun. 4, 2003 | (JP) | ............... 2003-158882 |
| Jun. 4, 2003 | (JP) | ............... 2003-158973 |
| Jun. 4, 2003 | (JP) | ............... 2003-158978 |
| Jun. 17, 2003 | (JP) | ............... 2003-172178 |
| Jul. 2, 2003 | (JP) | ............... 2003-270287 |

(51) Int. Cl.
*B23K 20/12* (2006.01)

(52) U.S. Cl. .................... 228/112.1; 228/2.1
(58) Field of Classification Search ............ 228/112.1, 228/2.1; 219/158, 161; 138/109, 151, 156–171; 29/33 D, 33 T, DIG. 41

See application file for complete search history.

(56) References Cited

U.S. PATENT DOCUMENTS 2,148,714 A * 2/1939 Urschel .................. 301/124.1

(Continued)

FOREIGN PATENT DOCUMENTS

EP    0 810 055 A1    12/1997

(Continued)

*Primary Examiner*—Jessica L Ward
*Assistant Examiner*—Megha Mehta
(74) *Attorney, Agent, or Firm*—Carrier, Blackman & Associates P.C.; Joseph P. Carrier; William D. Blackman

(57) ABSTRACT

A method of manufacturing a cylindrical body, comprising the step of forming the cylindrical body by bending a plate-like work having first projected finger to fourth projected finger at four corned parts and allowing the end faces thereof to abut on each other, wherein the main surface of the cylindrical body on the side where sags are present is formed in an outer peripheral wall surface and the rear surface thereof on the side where the burrs are present is formed in an inner peripheral wall surface, and a first projected part is formed of the first projected finger and the third projected finger and a second projected part is formed of the second projected finger and the fourth projected finger. After the cylindrical body is held by friction stir welding devices, the probe of a friction stir welding tool is buried from the direction of either of the first projected part and the second projected part, and scanned in the direction of the other of the second projected part and the first projected part. The probe is buried and scanned in the state of being displaced to an advancing side.

13 Claims, 23 Drawing Sheets

U.S. PATENT DOCUMENTS

| | | | | |
|---|---|---|---|---|
| 2,740,877 | A * | 4/1956 | Knauth et al. | 219/161 |
| 3,949,896 | A | 4/1976 | Luc | |
| 4,949,895 | A * | 8/1990 | Sugiyama et al. | 228/175 |
| 5,794,835 | A | 8/1998 | Colligan et al. | |
| 6,328,261 | B1 * | 12/2001 | Wollaston et al. | 244/132 |
| 2002/0020164 | A1 * | 2/2002 | Cleveland et al. | 60/39.01 |

FOREIGN PATENT DOCUMENTS

| | | |
|---|---|---|
| JP | 62-107832 | 5/1987 |
| JP | 05-084585 | 4/1993 |
| JP | 09-206951 | 8/1997 |
| JP | 10-071477 | 3/1998 |
| JP | 10-129204 | 5/1998 |
| JP | 10-937952 | 5/1998 |
| JP | 10-165297 | 6/1998 |
| JP | 10-193139 | 7/1998 |
| JP | 10-305373 | 11/1998 |
| JP | 11-058040 | 3/1999 |
| JP | 2000-225476 | 3/1999 |
| JP | 2000-202646 | 7/2000 |
| JP | 2000-301363 | 10/2000 |
| JP | 2001-219280 | 8/2001 |
| JP | 2002-224858 | 8/2002 |
| JP | 2002-283071 | 10/2002 |
| JP | 2003-039183 | 2/2003 |
| WO | WO 98/45080 | 10/1998 |
| WO | WO 99/33594 | 7/1999 |

* cited by examiner

METHOD OF MANUFACTURING CYLINDRICAL BODY, AND FRICTION STIR WELDING METHOD

TECHNICAL FIELD

The present invention relates to a method of manufacturing a hollow cylindrical body such as a vehicular wheel rim or the like by friction-stir-welding, wherein end faces thereof are held in abutment against each other by curving a plate-like workpiece, a friction stir welding method which can appropriately be performed to manufacture such a hollow cylindrical body, and a friction stir welding apparatus for supporting a hollow cylindrical body during manufacturing of the same.

BACKGROUND ART

Wheels for mounting automotive tires thereon are manufactured by joining a disk formed as a circular plate and a wheel rim formed as a hollow cylindrical body to each other, by welding or the like. Such a wheel is referred to as a two-piece wheel.

According to a method of manufacturing a wheel rim, as disclosed in Japanese Laid-Open Patent Publication No. 9-206951 and Japanese Laid-Open Patent Publication No. 10-129204, a plate having an elongate rectangular shape is curved and opposite ends thereof are brought into abutment against each other, producing a hollow cylindrical body, and the abutting opposite ends (abutting regions) are resistance-welded by means of a so-called resistance butt welding process. According to Japanese Laid-Open Patent Publication No. 62-107832, it is proposed to form a hollow cylindrical body in the same manner as described above, and to join the abutting regions by MIG welding or TIG welding.

When abutting regions are welded by the welding processes disclosed in Japanese Laid-Open Patent Publication No. 9-206951, Japanese Laid-Open Patent Publication No. 10-129204, and Japanese Laid-Open Patent Publication No. 62-107832, metal in the vicinity of the weld tends to rise in a swelling formation. Since swelling makes the welded wheel rim low in product quality, the welded wheel rim needs to be finished to grind off such swelling. Accordingly, wheel rims cannot be manufactured efficiently using the disclosed welding processes.

Friction stir welding may be used to weld abutting regions, without producing swelling on the welded assembly, and hence without the need for finishing the welded assembly. According to a friction stir welding process, a friction stir welding tool is rotated, and a probe on the tip end of the friction stir welding tool is plunged into abutting regions of the end faces that are to be welded. Frictional heat is generated in the vicinity of the abutting regions, causing a plastic flow of the material at the workpiece ends including the end faces thereof, so as to join the end faces to each other.

Because the probe is pressed into the abutting regions to be welded during the friction stir welding process, the abutting regions are liable to become spaced apart, tending to develop a clearance therebetween. When such a clearance is formed, the welded strength is lowered, thereby producing a welding defect.

In order to avoid the above shortcomings of the friction stir welding process, a process for friction-stir-welding sheets, to press the end faces of the sheets along a direction in which the rotating tool is displaced has been proposed, thereby preventing the sheets from becoming spaced apart, as disclosed in Japanese Laid-Open Patent Publication No. 10-193139. However, although the proposed process is effective for joining sheets together, it is not applicable to manufacturing a hollow cylindrical body, such as a wheel rim or the like.

According to the friction stir welding process, if the probe is plunged such that its central axis is aligned with the joint between abutting end faces, then unjoined regions may remain in a probe operation surface and an opposite surface (reverse side) in the abutting regions. When such unjoined regions remain, they reduce the bonding strength of the weld. If the bonding strength is excessively small, then the welded assembly may possibly start to crack away from the weld when plastic machining is performed on the workpiece. Japanese Patent No. 2808943 proposes a process for avoiding welding defects produced by laser welding using a filler. However, the proposed process cannot be used to avoid welding defects produced during a friction stir welding process, since a filler is not employed in the friction stir welding process.

According to one solution to the problem of remaining unjoined regions, it is customary to keep the tip end of the probe spaced from the reverse side of the workpiece, by a distance (gap) of 0.1 mm or less. However, providing such a small gap is not easy, and it takes a long time to form the gap between the tip end of the probe and the reverse side of the workpieces.

When a plate-like workpiece is curved and its opposite ends are brought into abutment against each other, producing a hollow cylindrical body to manufacture a wheel rim, one of the opposite ends possibly may overlap with the other end. A hollow cylindrical body with overlapping ends cannot be joined by friction stir welding.

The above drawback can be eliminated by spacing the end faces slightly apart from each other and then bringing them back into abutment with each other, without causing overlapping, after the diameter of the hollow cylindrical body is slightly increased. However, carrying out such a process is tedious and time-consuming, and tends to lower production efficiency of the friction stir welding process.

Another problem, even if opposite ends of the hollow cylindrical body are prevented from overlapping with each other, is that the hollow cylindrical body may have an elliptical cross-sectional shape, rather than a true circular cross-sectional shape. In this case, since the hollow cylindrical body does not have a true circular cross-sectional shape, the welded workpiece cannot produce a usable product, or stated otherwise, product yield is lowered.

If the hollow cylindrical body has an elliptical cross-sectional shape that is elongate horizontally, then as shown in FIG. 23, end faces 1, 2 abut against each other while being positionally displaced, so as to be oriented toward a center of the cross-sectional shape while being spread away from each other.

SUMMARY OF THE INVENTION

It is a general object of the present invention to provide a method of easily and simply manufacturing a hollow cylindrical body, which is of excellent quality and appearance, according to friction stir welding, thereby efficiently manufacturing a hollow cylindrical body.

A major object of the present invention is to provide a friction stir welding method, which is capable of preventing unjoined regions from remaining, and hence being cable of producing a joint having a sufficient bonding strength.

Another object of the present invention is to provide a friction stir welding apparatus, which may be used for friction-stir-welding abutting end faces of a hollow cylindrical body.

The above and other objects, features, and advantages of the present invention will become apparent from the following description when taken in conjunction with the accompanying drawings, in which preferred embodiments of the present invention are illustrated by way of example.

According to a first aspect of the present invention, there is provided a method of manufacturing a hollow cylindrical body, comprising the steps of:

bringing end faces of a plate material, having fingers projecting from corners along a joining direction, into abutment against each other to form protrusions projecting along the joining direction with end faces of the fingers, and also to form a hollow cylindrical body;

gripping the protrusions and friction-stir-welding abutting regions of the end faces to join the end faces to each other, thereby forming a hollow cylindrical body having protrusions; and removing the protrusions.

According to the first aspect, when the plate-material having fingers is curved, the fingers are brought into abutment against each other to form protrusions, and then the abutting regions are friction-stir-welded while the protrusions are gripped in place.

Since the protrusions are gripped in place while the friction stir welding process is in progress, the abutting end faces (abutting regions) of the hollow cylindrical body are prevented from becoming spaced from each other, or stated otherwise, the hollow cylindrical body is prevented from becoming opened. Therefore, the friction stir welding process is easily and reliably performed.

The friction stir welding process makes it possible to join the abutting regions without forming swellings. Therefore, the welded hollow cylindrical body does not need to be finished for smoothing out such swellings. Consequently, it is possible to efficiently manufacture a hollow cylindrical body having a good appearance.

The hollow cylindrical body (W2) with protrusions should preferably be pressed from a side of an outer circumferential wall surface thereof, when the abutting regions are friction-stir-welded. Thus, the hollow cylindrical body is more reliably prevented from becoming opened and returning to a plate shape.

In any case, the abutting regions should preferably be friction-stir-welded while the hollow cylindrical body is inclined with respect to the horizontal direction. Since the area of contact between the hollow cylindrical body and a friction stir welding tool used for friction-stir-welding the hollow cylindrical body is reduced, the friction stir welding tool is subjected to less load.

A preferred example of a hollow cylindrical body thus manufactured may be a wheel rim, which is joined to a wheel disk to produce a vehicular wheel.

According to a second aspect of the present invention, a friction stir welding process is provided, for bringing a first end face and a second end face of a metal workpiece into abutment against each other, and thereafter joining the first end face and the second end face to each other using a rotating friction stir welding tool, wherein when a first end having the first end face is present on a retreating side and a second end having the second end face is present on an advancing side, a workpiece plunging member having a substantially circular cross section which is disposed on the tip end of the friction stir welding tool is plunged with a central region thereof, being displaced from a boundary line between the first end face and the second end face to the second end within a range equal to or smaller than the radius of the workpiece plunging member.

Since the workpiece plunging member is displaced from the boundary lines between the end faces within a range equal to or smaller than the radius of the workpiece plunging member and is plunged into the second end (advancing side), the amounts of material stirred in the first end and the second end are substantially equal to each other. Therefore, an unjoined region is prevented from remaining in the joined end faces, and a joint having excellent bonding strength is obtained.

Since an unjoined region is prevented from remaining, the managed value of a gap may be increased. Therefore, an operation for forming the gap is quite easy to perform, and the time required to perform the operation is greatly reduced.

Plunging a probe into a region spaced from the abutting regions is disclosed in Japanese patent No 3081817, Japanese Laid-Open Patent Publication No. 10-137952, and Japanese Laid-Open Patent Publication No. 2000-225476. According to these conventional arrangements, the probe is widely spaced from the abutting regions. According to the second aspect of the present invention, however, the distance between the boundary line (abutting regions) between the first end face and the second end face and the probe (workpiece plunging member) is equal to or smaller than the radius of the probe. The present invention differs from the conventional arrangements in this regard.

The workpiece plunging member should preferably be displaced from the boundary line to the second end by a distance equal to or smaller than one-half of the radius of the workpiece plunging member because the workpiece plunging member thus displaced is more reliably effective in preventing an unjoined region from remaining.

According to the second aspect, the end faces of different members, rather than the end faces of the hollow cylindrical body, may be joined to each other. Specifically, a workpiece having the first end face and a workpiece having the second end face may be separate from each other. The workpiece having the first end face and the workpiece having the second end face may be made of a chief component comprising the same metal. Specifically, Al alloys having Al as a main component and different auxiliary components may be joined to each other, e.g., an Al—Mg—Si alloy may be selected for the workpiece having the first end face, and an Al—Zn—Mg alloy may be selected for the workpiece having the second end face. Of course, Al and Al alloys may be friction-stir-welded to each other.

According to a third aspect of the present invention, there is provided a friction stir welding process for bringing a first end face and a second end face of a metal workpiece having a curved surface into abutment against each other to form abutting regions, and then friction-stir-welding the abutting regions to join the end faces to each other, wherein:

the first end face and the second end face have burrs projecting in a thickness direction of the metal workpiece, and sags projecting in a direction transverse to the thickness direction;

when the abutting regions are formed, the sags of the first end face and the second end face are disposed in confronting relation to each other and positioned on an outer circumferential wall surface of the curved surface, and the burrs are positioned on an inner circumferential wall surface of the curved surface; and when the abutting regions are friction-stir-welded, a plunging member of a friction stir welding tool is plunged into the outer circumferential wall surface on which the sags are disposed in confronting relation to each other, and thereafter the friction stir welding tool is moved to scan the abutting regions.

The surface where the sags are present is longer than the reverse surface by the projecting sags. If the metal workpiece is curved, such that the surface where the sags are present is positioned as an outer circumferential wall surface whose circumferential length is larger than the inner circumferential wall surface, then since the circumferential length of the outer circumferential wall surface is compensated for, any gap formed between the end faces can be reduced.

The reduced gap results in an increase in the area of contact between the end faces. Therefore, when the abutting regions are friction-stir-welded, a large amount of material is stirred, producing a sufficient amount of frictional heat. Since the friction stir welding process progresses easily, a large number of cavities are prevented from being formed in the joint. The joint thus maintains a desired bonding strength, i.e., a product having excellent bonding strength is obtained.

The invention according to the third aspect is applicable to friction-stir-welding the end faces of one member as well as joining the end faces of different members. Stated otherwise, according to the third aspect, the end faces of one metal workpiece may be friction-stir-welded. Specifically, if one metal workpiece has a first end face and a second end face, then the abutting regions are provided by curving the metal workpiece to bring the first end face and the second end face into abutment against each other. Thereafter, the abutting regions may be friction-stir-welded.

According to a fourth aspect of the present invention, there is provided a friction stir welding apparatus for bringing end faces of a plate material, having fingers projecting from corners thereof along a joining direction, into abutment against each other to form a hollow cylindrical body having protrusions, and joining abutting regions to produce a hollow cylindrical body, comprising:

a base;

a first columnar member and a second columnar member which are vertically mounted on the base;

a support member inserted into the hollow cylindrical body having protrusions and being mounted on and extending between the first columnar member and the second columnar member when the abutting regions are to be friction-stir-welded; and a first gripping member and a second gripping member supported on the support member for gripping the protrusions, respectively, which are formed when the fingers are held in abutment against opposite ends of the abutting regions of the hollow cylindrical body having protrusions and which extend along a joining direction.

With the above arrangement, the protrusions of the hollow cylindrical body can be gripped in place. Therefore, while the abutting regions are friction-stir-welded, the hollow cylindrical body is reliably prevented from being opened.

Preferably, the first columnar member has a rotational shaft, and the support member has an end coupled to a rotary board fixed to the rotational shaft, the friction stir welding apparatus comprising a rotating mechanism for rotating the rotary board. Since the rotary board is rotated by the rotating mechanism, the support member is turned. Therefore, the hollow cylindrical body, whose protrusions are gripped by the first gripping member and the second gripping member, can easily be moved to a location where the abutting regions are to be friction-stir-welded.

At least one of the first gripping member and the second gripping member should preferably be displaceable toward or away from the protrusions by a gripping member displacing mechanism. The hollow cylindrical body can easily be gripped in place simply by displacing the first gripping member or the second gripping member.

The friction stir welding apparatus should preferably have outer circumference pressing members, for pressing the hollow cylindrical body from the side of an outer circumferential wall surface thereof, the outer circumference pressing members having a gap for inserting a rotating friction stir welding tool for joining the abutting regions of the hollow cylindrical body. When the outer circumference pressing members press the hollow cylindrical body from the side of the outer circumferential wall surface thereof, the hollow cylindrical body is prevented more reliably from being opened. Therefore, the abutting regions can easily and reliably be friction-stir-welded.

The friction stir welding apparatus should preferably have an outer circumference pressing member displacing mechanism, for displacing the outer circumference pressing members toward or away from the hollow cylindrical body. Since the outer circumference pressing members are easily displaced by the outer circumference pressing member displacing mechanism, it is unnecessary to perform a tedious and time-consuming process for installation and removal of the outer circumference pressing members.

The support member should preferably be mounted on and extend between the first columnar member and the second columnar member obliquely to a horizontal direction.

Since the support member is mounted on and extends between the first columnar member and the second columnar member obliquely, the hollow cylindrical body, which is gripped by the first gripping member and the second gripping member that are disposed on the support member, is also inclined. The area of contact between the hollow cylindrical body and a friction stir welding tool for friction-stir-welding the hollow cylindrical body is made smaller than if the hollow cylindrical body were supported horizontally. Consequently, the friction stir welding tool incurs less load than if the friction stir welding tool were moved horizontally.

According to a fifth aspect of the present invention, there is provided a friction stir welding apparatus for bringing end faces of a plate material, having fingers at corners thereof, into abutment against each other to form a hollow cylindrical body, and friction-stir-welding the end faces to each other, comprising:

a base;

first support means and second support means which are mounted on the base;

a support member supported by the first support means and the second support means;

pressing means supported by the support member, and movable forward or backward by a displacing means, for pressing the hollow cylindrical body from the side of an inner circumferential wall surface thereof;

a support core supported by the support member, for insertion into the hollow cylindrical body and for supporting the hollow cylindrical body; and a first gripping member and a second gripping member disposed on the support core, for gripping respective protrusions, which are formed when the fingers are held in abutment against opposite ends of abutting regions of the hollow cylindrical body, and which extend along a joining direction.

According to the fifth aspect, after the hollow cylindrical body is set in the friction stir welding apparatus, the inner circumferential wall surface of the hollow cylindrical body is pressed by the pressing means. When the inner circumferential wall surface of the hollow cylindrical body is thus pressed, the abutting end faces of the hollow cylindrical body are slightly spaced from each other. Since the abutting end faces are spaced from each other, the end faces are released from a stacked state. Therefore, it is not necessary to perform a tedious and time-consuming process, and the end faces can be friction-stir-welded efficiently.

The pressing means may comprise a cam, which is movable forward or backward as the displacing means moves forward or backward, a plurality of rods engaging the cam and extending perpendicularly to the direction in which the cam is movable forward or backward, and pressers mounted on respective distal ends of the rods, for pressing an inner circumferential wall surface of the hollow cylindrical body.

The support core should preferably have a discharge port defined therein for discharging a compressed gas. If the end faces of the hollow cylindrical body, which are eliminated from a stacked state and closed again, are spaced from each other, then the compressed gas passes upwardly through a gap between the spaced end faces. If the end faces are held in abutment against each other, with no gap therebetween, the compressed gas is blocked by the abutting end faces and does not pass upwardly. Therefore, the pressure of the compressed gas increases. The increase in the pressure is detected by a pressure sensor, for example, making it possible to easily confirm whether the end faces are spaced from each other or not.

According to a sixth aspect of the present invention, there is provided a friction stir welding apparatus for bringing end faces of a plate material, having fingers at corners thereof, into abutment against each other to form a hollow cylindrical body, and friction-stir-welding the end faces to each other, comprising:

a base;

first support means and second support means which are mounted on the base;

a support core spaced from the base by the first support means and the second support means, for insertion into the hollow cylindrical body and for supporting the hollow cylindrical body; and a first gripping member and a second gripping member disposed on the support core for gripping respective protrusions, which are formed when the fingers are held in abutment against opposite ends of abutting regions of the hollow cylindrical body and which extend along a joining direction;

wherein either one of the first support means and the second support means is movable toward or away from the support core by a displacing means.

With this arrangement, the longitudinal direction of the support core and the direction in which a friction stir welding tool is displaced may be aligned with each other. Stated otherwise, the hollow cylindrical body may be set along the direction in which the friction stir welding tool is displaced. Consequently, after the hollow cylindrical body is set on the support core, it is not necessary to position the hollow cylindrical body in alignment with the direction in which the friction stir welding tool is displaced. Therefore, the friction stir welding process can be performed quickly, and the efficiency thereof is increased.

The first support means or the second support means is preferably guided by a guide member while the first support means or the second support means is displaced. The first support means or the second support means can thus be reliably displaced to a given location.

The first support means or the second support means should preferably comprise natural lock cylinders. Such natural lock cylinders may have piston rods, which are elevated and support the support core after the natural lock cylinders are inactivated. When the cylinders are displaced, the cylinders are prevented from abutting against a certain member.

The natural lock cylinders refer to cylinders having a mechanism for locking a plunger under high hydraulic pressure.

According to a seventh aspect of the present invention, there is provided a friction stir welding apparatus for bringing end faces of a plate material, having fingers at corners thereof, into abutment against each other to form a hollow cylindrical body, and friction-stir-welding the end faces to each other, comprising:

a base;

first support means and second support means which are mounted on the base;

a support core spaced from the base by the first support means and the second support means, for insertion into the hollow cylindrical body and for supporting the hollow cylindrical body;

a first gripping member and a second gripping member disposed on the support core for gripping respective protrusions, which are formed when the fingers are held in abutment against opposite ends of abutting regions of the hollow cylindrical body, and which extend along a joining direction;

two aligning boards held in abutment against an end face of the hollow cylindrical body, and disposed one on each side of abutting regions of the hollow cylindrical body; and aligning means having a cylinder for pressing the hollow cylindrical body from the side of an opposite end face thereof, to displace the hollow cylindrical body until the one face of the hollow cylindrical body abuts against the aligning boards.

With this arrangement, the aligning means makes it possible to position, easily and reliably, end faces of the hollow cylindrical body in the joining direction. Thus, positional displacement of end faces of the hollow cylindrical body in the joining direction can be eliminated, without the need for a tedious and time-consuming process. The end faces can therefore be friction-stir-welded efficiently.

Either one of the first gripping member and the second gripping member may be displaced by the cylinder. Thus, the number of parts making up the friction stir welding apparatus is reduced, and the friction stir welding apparatus may be constructed at a reduced cost.

The first gripping member or the second gripping member should preferably be displaced and fit over the protrusion of the hollow cylindrical body after the displacement of the hollow cylindrical body is finished. The protrusions can thus be gripped without positional displacements. Therefore, it is possible to manufacture a hollow cylindrical body of better dimensional accuracy.

According to an eighth aspect of the present invention, there is provided a friction stir welding apparatus for bringing end faces of a plate material having fingers at corners thereof, into abutment against each other to form a hollow cylindrical body, and friction-stir-welding the end faces to each other, comprising:

a base;

first support means and second support means which are mounted on the base;

a support member supported by the first support means and the second support means;

a support core disposed on the support member, for being inserted into the hollow cylindrical body and supporting the hollow cylindrical body;

a first gripping member and a second gripping member disposed on the support core, for gripping protrusions, respectively, which are formed when the fingers are held in abutment against opposite ends of abutting regions of the hollow cylindrical body and which extend along a joining direction;

first pressing means supported by the support member, for pressing an inner circumferential wall surface of the hollow cylindrical body vertically downwardly with a resilient biasing means; and second pressing means supported by the support member and displaceable by displacing means for pressing an inner circumferential wall surface of the hollow cylindrical body horizontally.

According to the eighth aspect, the inner circumferential wall surface of the hollow cylindrical body is pressed individually vertically downwardly and horizontally. Since the hollow cylindrical body is stretched vertically downwardly and horizontally, the hollow cylindrical body is prevented from becoming elongate horizontally and vertically. The hollow cylindrical body thus becomes truly circular, and can be manufactured with an increased yield.

Vertical positional displacements of the end faces are also eliminated. Stated otherwise, the end faces are held vertically in good abutment against each other. Cavities are prevented from being formed in the joint, resulting in an increase in the product quality.

The friction stir welding apparatus should preferably have a presser stop means for pressing the hollow cylindrical body from the side of an outer circumferential wall surface thereof to a stop. Since not only the protrusions of the hollow cylindrical body are gripped, but also the hollow cylindrical body is pressed from the side of the outer circumferential wall surface, the hollow cylindrical body is prevented more reliably from being opened.

DETAILED DESCRIPTION OF EMBODIMENTS FOR CARRYING OUT THE INVENTION

Preferred embodiments of a method of manufacturing a hollow cylindrical body according to the present invention will be described in detail below with reference to the accompanying drawings in connection with friction stir welding processes and friction stir welding apparatus that are used for carrying out the method. In the embodiments, a wheel rim of aluminum is manufactured as a hollow cylindrical body by way of example.

Figure 1:
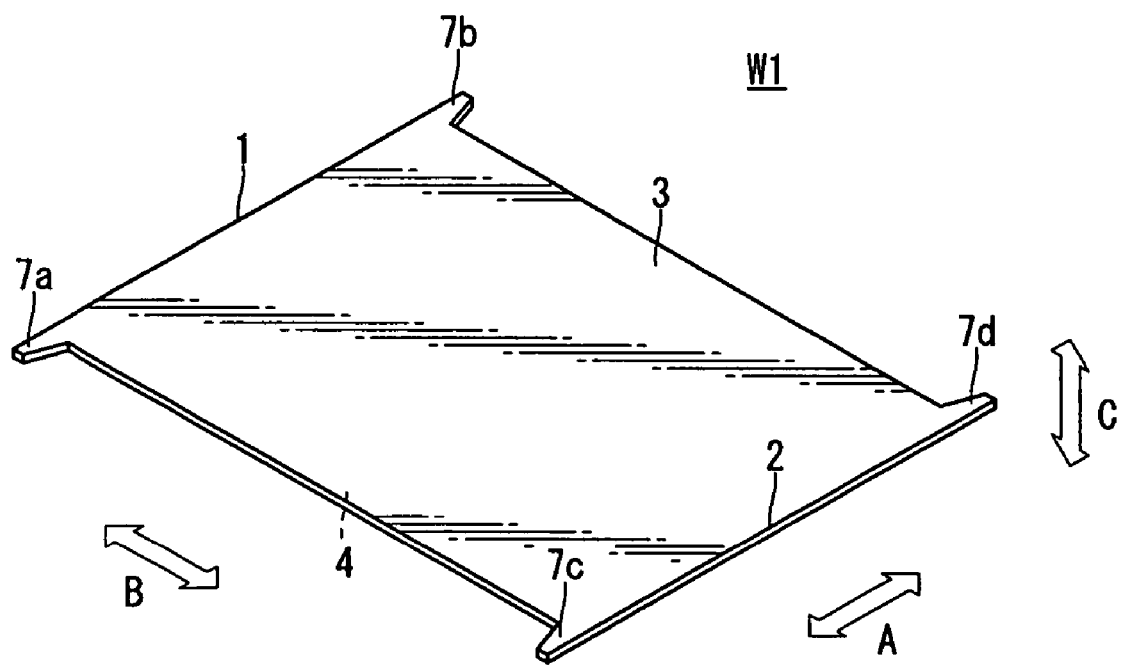
FIG. 1 is a perspective view of a plate-like workpiece for forming a wheel rim, having fingers on respective corners thereof.

An elongate workpiece of aluminum is cut by shearing into a plate-like workpiece W1 of substantially elongate rectangular shape, as shown in FIG. 1. In the description below, cut surfaces that are exposed by the cutting are referred to as end faces denoted by respective reference numerals 1, 2. A surface of the plate-like workpiece W1 that is visually recognized in FIG. 1 is referred to as a main surface, and a surface thereof that is reverse to the main surface is referred to as a back surface. These main and back surfaces are denoted by respective reference numerals 3, 4. In FIG. 1, the arrow A represents a joining direction referred to later, and the arrows B, C represent a longitudinal direction and a thickness direction, respectively.

Figure 2:
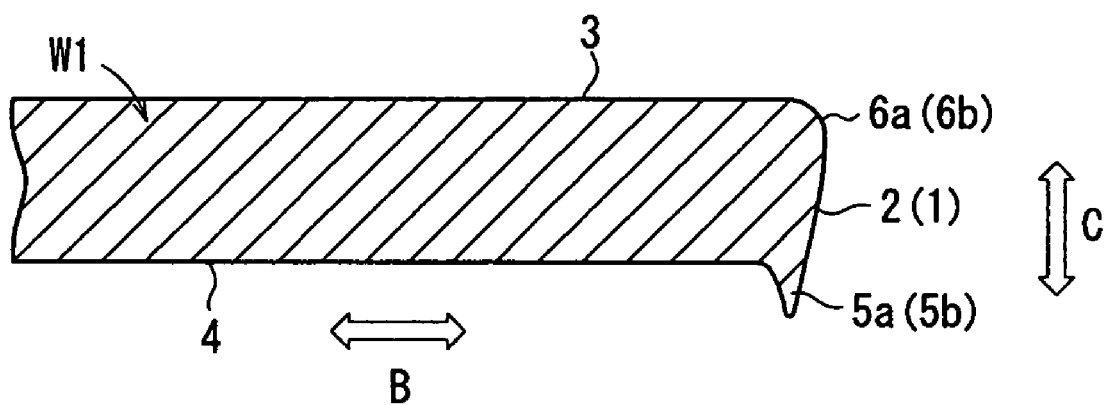
FIG. 2 is an enlarged fragmentary vertical cross-sectional view showing an end of the plate-like workpiece shown in FIG. 1 at an enlarged scale.

As shown in FIG. 2 at an enlarged scale, the end faces 1, 2 of the plate-like workpiece W1 have burrs 5a, 5b projecting along the thickness direction C of the plate-like workpiece W1 and sags 6a, 6b projecting along the longitudinal direction B (perpendicular to the thickness direction C) and having tip ends gradually curved. The burrs 5a, 5b and the sags 6a, 6b are formed when the plate-like workpiece W1 is sheared by a cutting tool in the above cutting process.

The burrs 5a, 5b extend from the back surface 4 along thickness direction C, and the sags 6a, 6b are displaced from central areas of the end faces 1, 2 in the thickness direction toward the main surface 3. Therefore, the length of the main surface 3 in the longitudinal direction is slightly greater than the length of the back surface 4 because the sags 6a, 6b are present.

First through fourth fingers 7a through 7d which are oriented in the directions indicated by the arrow A are disposed respectively at the four corners of the plate-like workpiece W1 (see FIG. 1). Stated otherwise, the first through fourth fingers 7a through 7d project along the joining direction.

Figure 3:
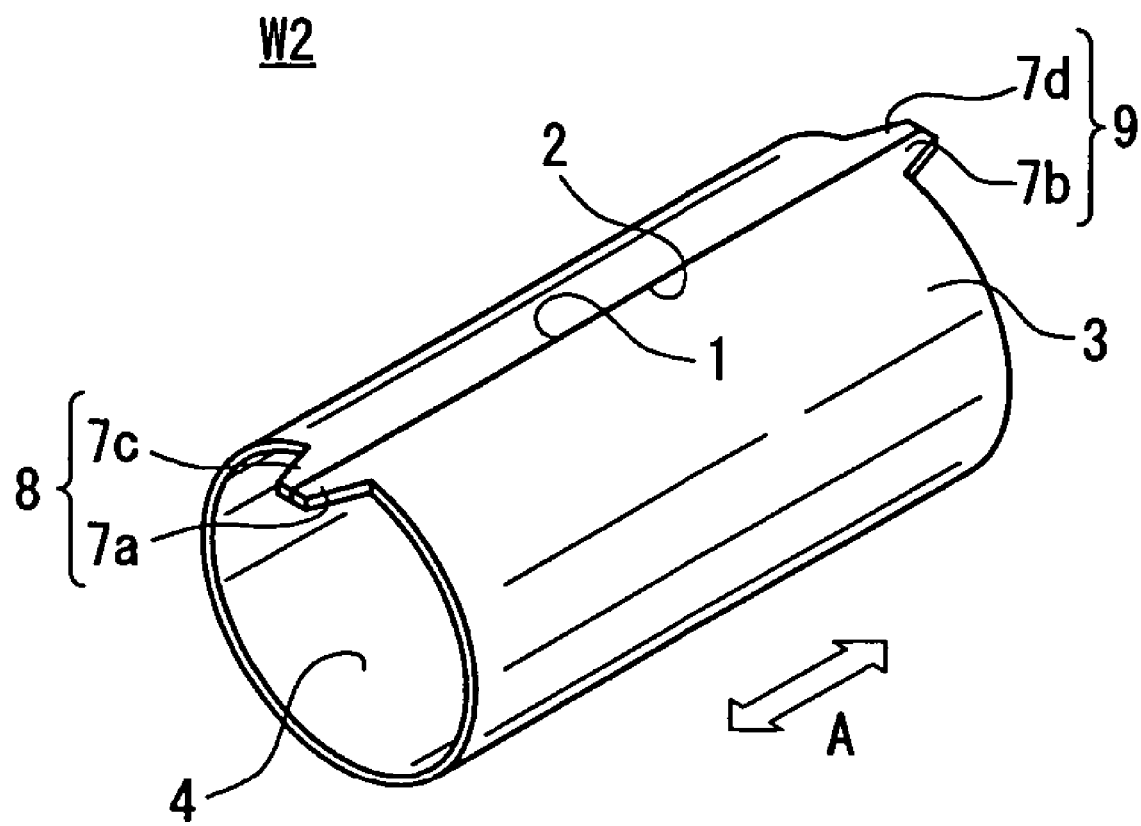
FIG. 3 is a perspective view of a hollow cylindrical body having protrusions, which is formed by curving the workpiece shown in FIG. 1 and bringing the fingers into abutment against each other.

The plate-like workpiece W1 thus shaped is curved along the directions indicated by the arrow B until finally the end faces of the plate-like workpiece W1 are brought into abutment against each other, as shown in FIG. 3, forming a hollow cylindrical body W2 having a first protrusion 8 and a second protrusion 9 that extend in the directions indicated by the arrow A. The first protrusion 8 is formed when the first finger 7a and the third finger 7c have their end faces abutting against each other, and the second protrusion 9 is formed when the second finger 7b and the fourth finger 7d have their end faces abutting against each other.

Figure 4:
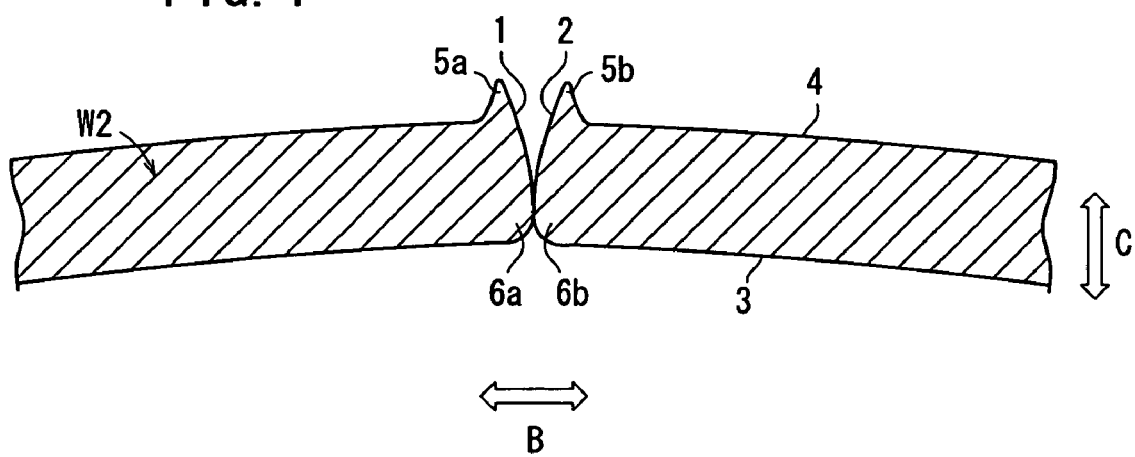
FIG. 4 is an enlarged fragmentary vertical cross-sectional view showing, at an enlarged scale, end faces abutting against each other, with sags as shown in FIG. 2 being held in abutment against each other on an inner circumferential wall surface, and having burrs extending from an outer circumferential wall surface.

If the hollow cylindrical body W2 is formed with the main surface 3 facing as an inner circumferential wall surface and the back surface 4 exposed as an outer circumferential wall surface, then as shown in FIG. 4 at an enlarged scale, the sags 6a, 6b protruding in the direction indicated by the arrow C abut against each other on the inner circumferential wall surface. On the outer circumferential wall surface, there is developed a gap because it is free of the sags 6a, 6b and the circumferential length of the outer circumferential wall surface and the circumferential length of the inner circumferential wall surface are different from each other when the plate-like workpiece W1 is curved. The gap reaches about 0.2 mm at maximum, resulting in a corresponding reduction in the area of contact between the end faces 1, 2.

According to the present embodiment, the plate-like workpiece W1 is curved into the hollow cylindrical body W2 with the back surface 4 facing as the inner circumferential wall surface and the main surface 3 facing as the outer circumferential wall surface. Specifically, the main surface 3 that is longer in the directions indicated by the arrow B by the sags 6a, 6b is exposed as the outer circumferential wall surface whose circumferential length is larger than the inner circumferential wall surface, holding the heads of the sags 6a, 6b in abutment against each other.

Figure 5:
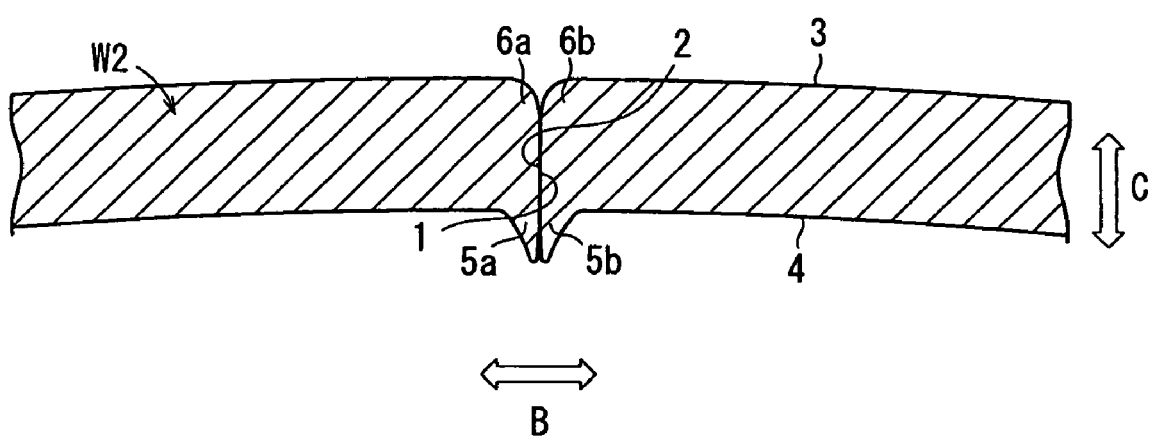
FIG. 5 is an enlarged fragmentary vertical cross-sectional view showing, at an enlarged scale, end faces abutting against each other, with sags as shown in FIG. 2 being held in abutment against each other on an outer circumferential wall surface, and having burrs extending from an inner circumferential wall surface.

As shown in FIG. 5 at an enlarged scale, the crests of the sags 6a, 6b are held in abutment against each other on the outer circumferential wall surface, thereby preventing a gap from being developed in the abutting regions on the outer circumferential wall surface of the hollow cylindrical body W2. Stated otherwise, the area of contact between the end faces 1, 2 becomes larger than if the back surface 4 is exposed as the outer circumferential wall surface.

Structural details of a friction stir welding apparatus according to a first embodiment will be described below.

Figure 6:
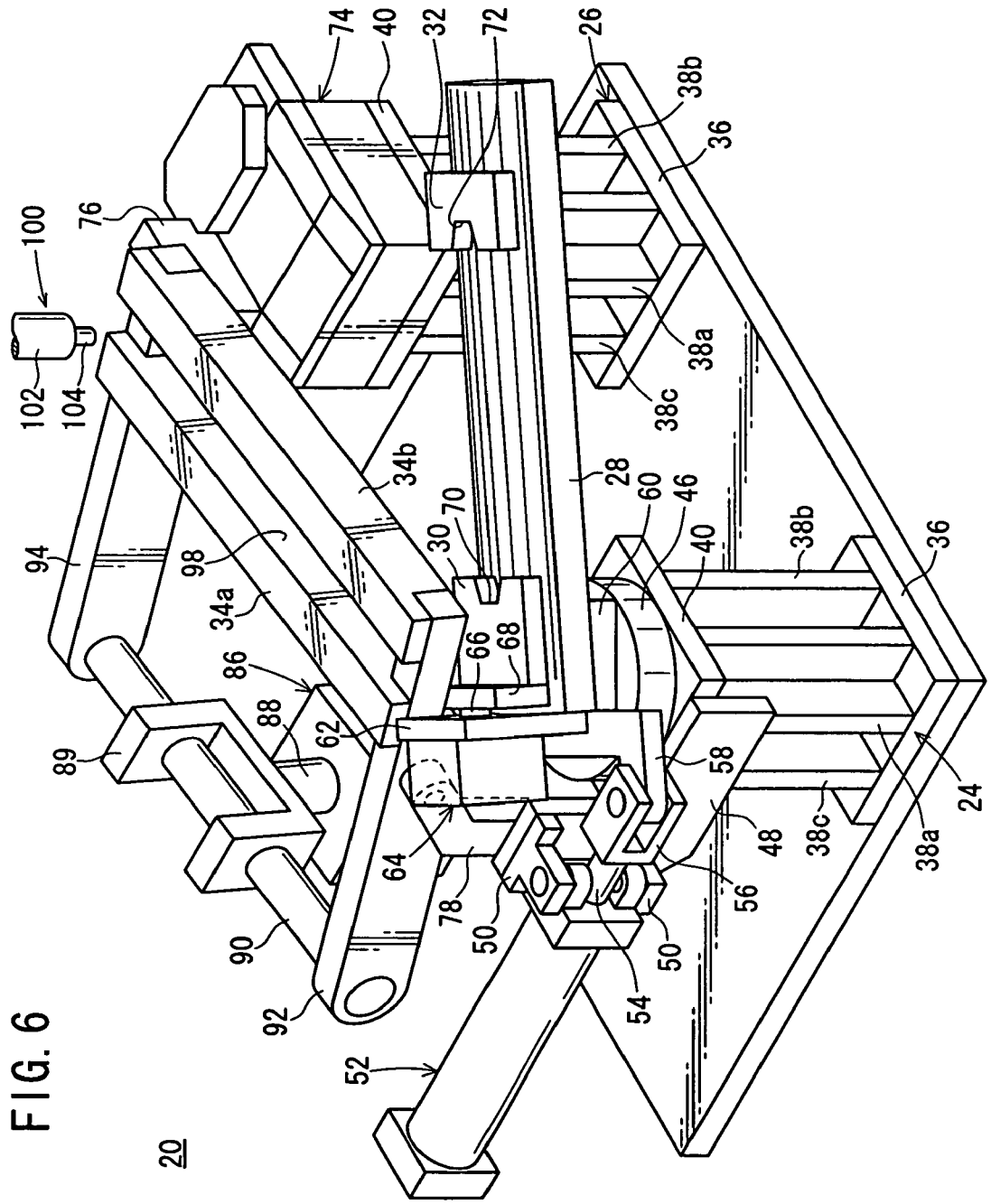
FIG. 6 is a perspective view of a friction stir welding apparatus according to a first embodiment.
Figure 7:
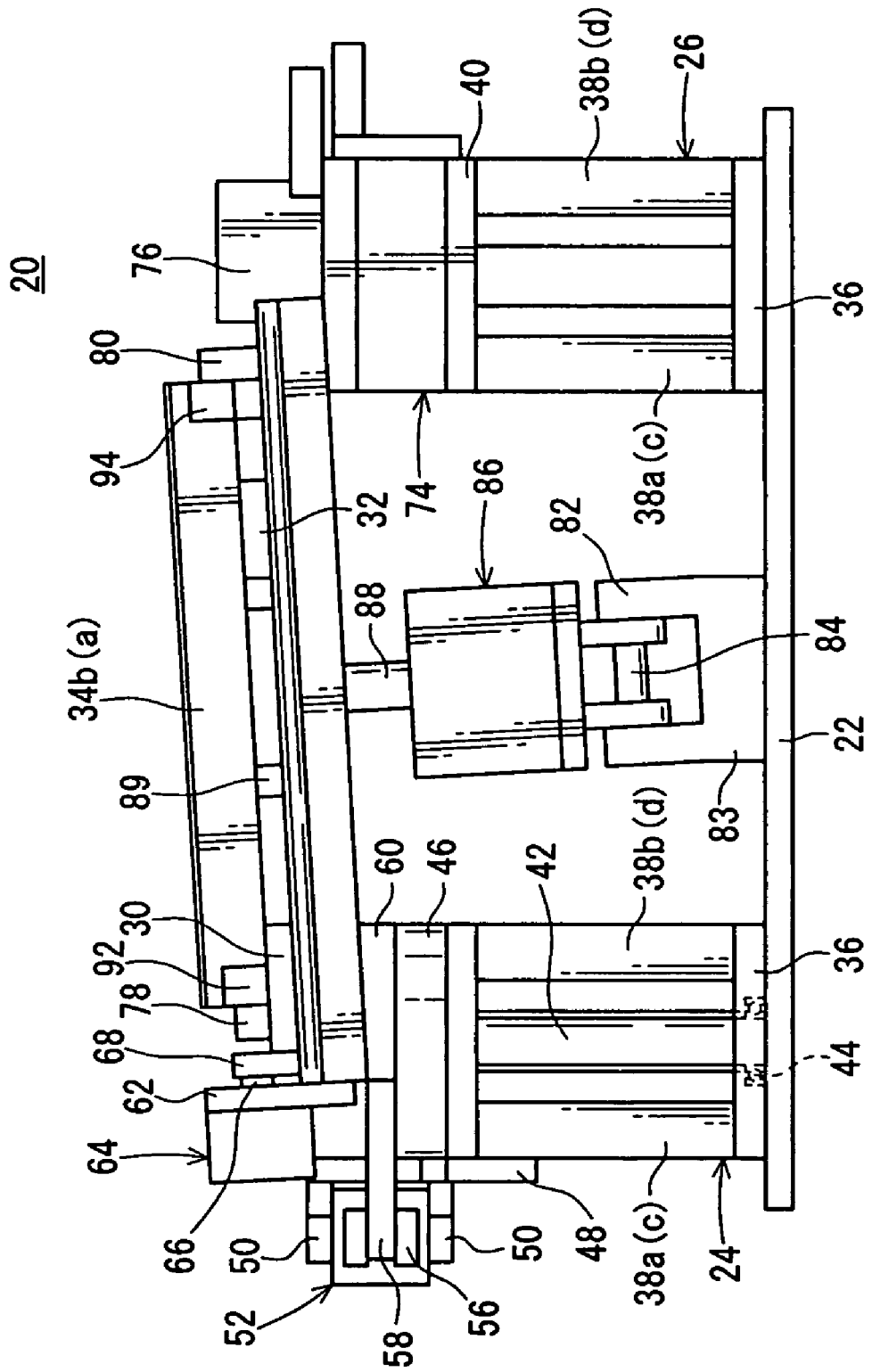
FIG. 7 is a front elevational view of the friction stir welding apparatus shown in FIG. 6.

FIG. 6 is a perspective view of the friction stir welding apparatus according to the first embodiment, and FIG. 7 is a front elevational view of the friction stir welding apparatus according to the first embodiment. As can be seen from FIGS. 6 and 7, the friction stir welding apparatus 20 comprises a base 22, a first columnar member 24 and a second columnar member 26, a support member 28, a first gripping member 30 and a second gripping member 32, and two prismatic bar members (outer circumference pressing members) 34a, 34b having projections. In FIG. 6, the support member 28 is shown as being turned and released from the second columnar member 26. In FIG. 7, the support member 28 is shown as extending from the first columnar member 24 to the second columnar member 26.

As shown in FIG. 7, the first columnar member 24 that is vertically mounted on the base 22 has a bottom board 36, L-shaped columnar members 38a through 38d, a top board 40, and a rotational shaft 42 surrounded by the bottom board 36, the L-shaped columnar members 38a through 38d, and the top board 40. A plurality of bearings 44 are interposed between the rotational shaft 42 and the bottom board 36. The top board 40 has a through hole defined therein, and the rotational shaft 42 has a distal end portion projecting through the through hole upwardly of the top board 40. The L-shaped columnar members 38a through 38d have a substantially L-shaped cross section (see FIG. 6).

A substantially disk-shaped rotary board 46 is coupled to the distal end of the rotational shaft 42 that projects upwardly of the top board 40 and spaced a predetermined distance from the top board 40 (see FIGS. 6 and 7). As described later, the support member 28 is turned as the rotary board 46 rotates in synchronism with the rotational shaft 42.

A bent support board 48 is coupled to side surfaces of the L-shaped columnar members 38a, 38c and the top board 40 (see FIG. 6). Brackets 50, 50 are fixed to the support board 48. A cylinder 52 is angularly movably supported on the brackets 50, 50.

The cylinder 52 has a rod 54 with a bracket 56 secured to a distal end thereof. A bent joint arm 58 is coupled to the bracket 56. The bent joint arm 58 is coupled to the rotary board 46. In FIG. 7, the support member 28 is stacked on a slanted pedestal 60 having an upper end face inclined upwardly by an angle of about 3° toward the second columnar member 26. The support member 28 and the slanted pedestal 60 are coupled to the rotary board 46 upwardly of the rotational shaft 42. Thus, the slanted pedestal 60 is interposed between the rotary board 46 and the support member 28, so that the support member 28 is obliquely coupled to the rotational shaft 42.

The support member 28 has a central region in the width direction thereof that is perpendicular to the longitudinal direction thereof, and the central region is curved to project from opposite ends of the support member 28 (see FIG. 6). The inner circumferential wall of the hollow cylindrical body W2 is placed along the curved central region.

A cylinder support board 62 is fixed to the end of the support member 28 that is stacked on the slanted pedestal 60. A cylinder 64 is coupled to the cylinder support board 62.

The cylinder 64 has a rod 66 extending through a through hole defined in the cylinder support board 62, and a presser plate 68 is mounted on the distal end of the rod 66.

The first gripping member 30 is fixedly coupled to the presser plate 68. When the rod 66 of the cylinder 64 moves forward or backward, the first gripping member 30 also moves forward or backward on the support member 28. The first gripping member 30 has a recess 70 defined therein which is complementary in shape to the first protrusion 8.

The second gripping member 32 is coupled to the upper end face of the support member 28 at a position that is a predetermined distanced spaced from the first gripping member 30. Stated otherwise, the second gripping member 32 is positioned and fixed to the support member 28. The second gripping member 32 has a recess 72 defined therein which is complementary in shape to the second protrusion 9.

The first gripping member 30 and the second gripping member 32 have respective lower ends curved complementarily to the curved upper end face of the support member 28. Therefore, the first gripping member 30 and the second gripping member 32 are prevented from being displaced in the transverse direction of the support member 28.

The second columnar member 26 is vertically mounted on the base 22 and spaced a predetermined distance from the first columnar member 24 (see FIGS. 6 and 7), and is higher than the first columnar member 24. Those components of the second columnar member 26 which are identical to those of the first columnar member 24 are denoted by identical reference characters, and will not be described in detail below.

A pedestal 74 having a slanted portion is disposed on the top board 40 of the second columnar member 26. A stopper 76 for stopping angular movement of the support member 28 is fixed to an end face of the top board 40.

Figure 8:
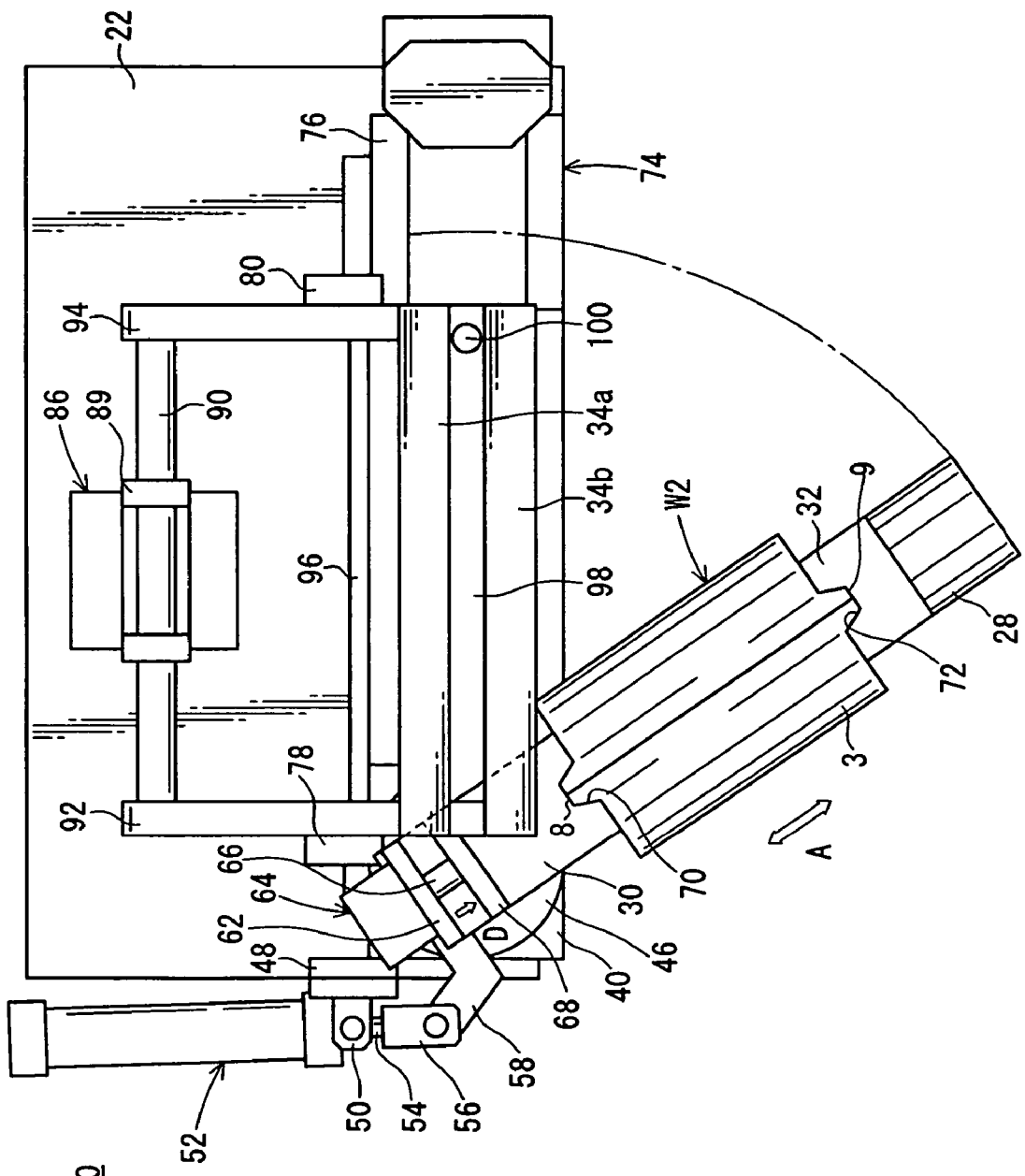
FIG. 8 is a plan view showing the manner in which a first gripping member and a second gripping member of the friction stir welding apparatus shown in FIG. 6 grip the protrusions of the hollow cylindrical body shown in FIG. 3.

A first shaft engaging member 78 having a bent distal end is fixedly coupled to the L-shaped columnar member 38*d* of the first columnar member 24. As shown in FIGS. 7 and 8, a second shaft engaging member 80 is also fixedly coupled to the L-shaped columnar member 38*c* of the second columnar member 26. The second shaft engaging member 80 is shaped similarly to the first shaft engaging member 78.

As shown in FIG. 7, a mount 83 having a bracket 82 is installed on the base 22. A cylinder 86 is supported on the bracket 82 by a shaft 84.

The cylinder 86 has a rod 88 with a bracket 89 mounted on the distal end thereof (see FIGS. 6 and 8). A first arm 92 and a second arm 94 are coupled to the bracket 89 by a rod 90 (see FIG. 6). Specifically, the first arm 92, the bracket 89, and the second arm 94 have respective through holes defined in their ends, and the rod 90 extends through these through holes.

The first arm 92 and the second arm 94 have other through holes defined therein at positions slightly closer to the support member 28 than longitudinally central regions thereof. A joint rod 96 (see FIG. 8) extends through these through holes and through holes that are defined in the first shaft engaging member 78 and the second shaft engaging member 80, thereby coupling the first arm 92 and the first shaft engaging member 78 to each other and also coupling the second arm 94 and the second shaft engaging member 80. The first shaft engaging member 78 is held against a side surface of the first arm 92, and the second shaft engaging member 80 is held against a side surface of the second arm 94.

The first arm 92 and the second arm 94 have respective distal end portions extending to positions above the first columnar member 24 and the second columnar member 26, respectively. The prismatic bar members 34*a*, 34*b* that are spaced a predetermined distance from each other extend from the distal end portion of the first arm 92 to the distal end portion of the second arm 94. The prismatic bar members 34*a*, 34*b* have teeth extending from their opposite ends, and these teeth are placed on the first arm 92 and the second arm 94 and coupled to and supported on the first arm 92 and the second arm 94.

As described later, the prismatic bar members 34*a*, 34*b* function as outer circumference pressing members for pressing the outer circumferential wall surface of the hollow cylindrical body W2 (see FIGS. 2 and 3). A friction stir welding tool 100 for welding abutting end faces of the hollow cylindrical body W2 is inserted in a gap 98 (see FIGS. 6 and 8) between the prismatic bar members 34*a*, 34*b*.

The friction stir welding tool 100 has a rotor 102 (see FIG. 6) fixed to a spindle, not shown, and a probe 104 mounted on the tip end of the rotor 102.

A friction stir welding process for joining the hollow cylindrical body W2 and a process of manufacturing a wheel rim are performed using the friction stir welding apparatus 20 thus constructed, as follows:

First, the hollow cylindrical body W2 with the first protrusion 8 and the second protrusion 9 formed thereon is placed onto the support member 28 with the first protrusion 8 being positioned ahead. Thereafter, the second protrusion 9 is fitted into the recess 72 in the second gripping member 32.

Then, the cylinder 64 is actuated to move the rod 66 forward. The first gripping member 30 is pressed by the presser plate 68. As a result, as shown in FIG. 8, the first gripping member 30 moves forward in the direction indicated by the arrow D, causing the first protrusion 8 to fit into the recess 70. The hollow cylindrical body W2 is now gripped by the first gripping member 30 and the second gripping member 32, and hence is prevented from being opened back into a plate shape.

Figure 9:
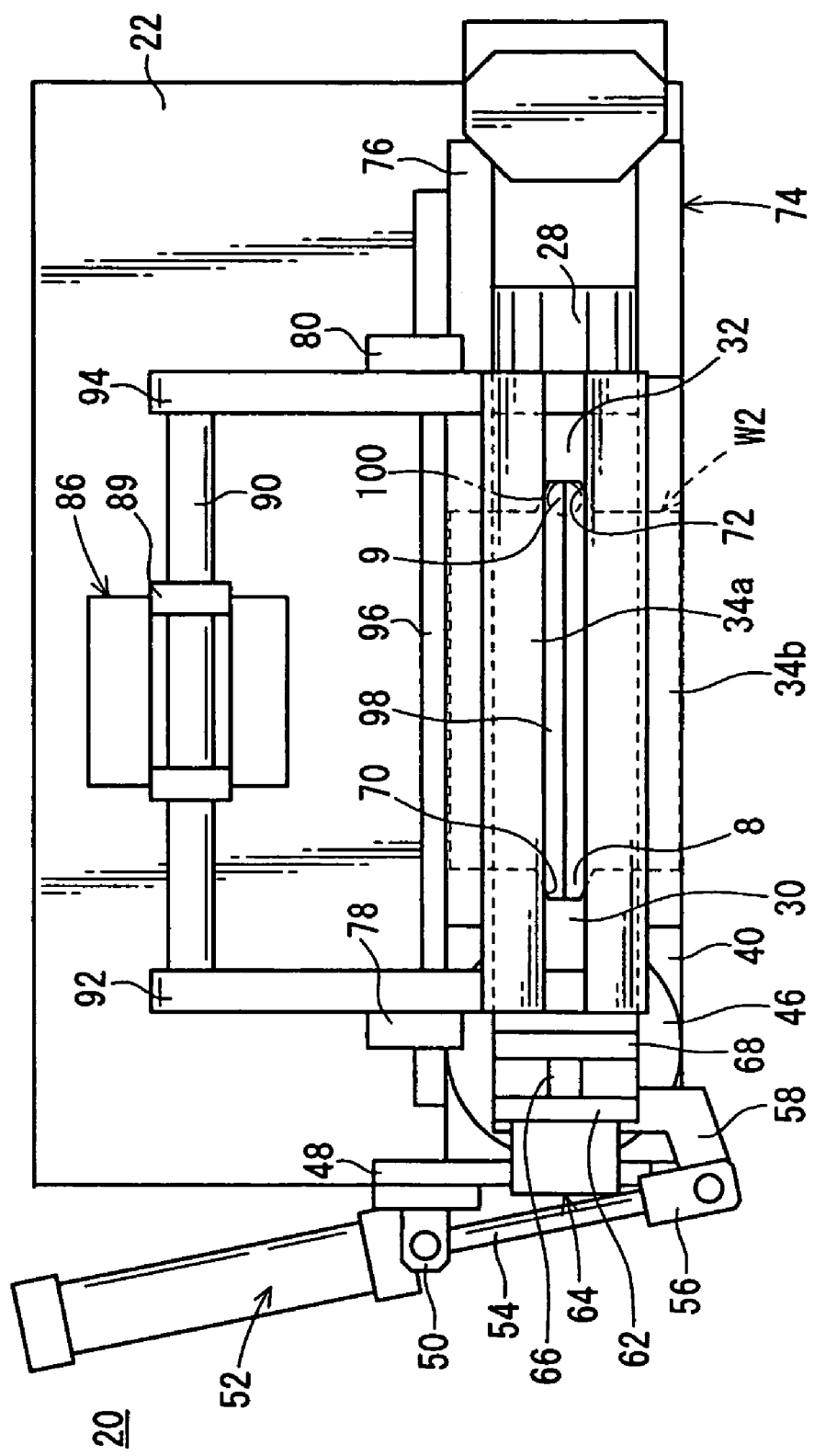
FIG. 9 is a plan view showing the manner in which a support member is turned and extends from a first columnar member to a second columnar member, with the hollow cylindrical body disposed between the first columnar member to the second columnar member.

Then, the cylinder 52 is actuated to forward the rod 54. At this time, the cylinder 52 is angularly moved about its portion which is pivotally supported by the brackets 50, 50. The joint arm 58 is forwarded to turn the rotary board 46. The slanted pedestal 60 and the support member 28 are turned about their portions which are coupled to the rotary board 46 until finally the support member 28 abuts against the stopper 76 and is positioned to extend from the first columnar member 24 to the second columnar member 26, as shown in FIG. 9. At this time, the support member 28 is inclined with respect to the horizontal direction (see FIG. 7).

Figure 10:
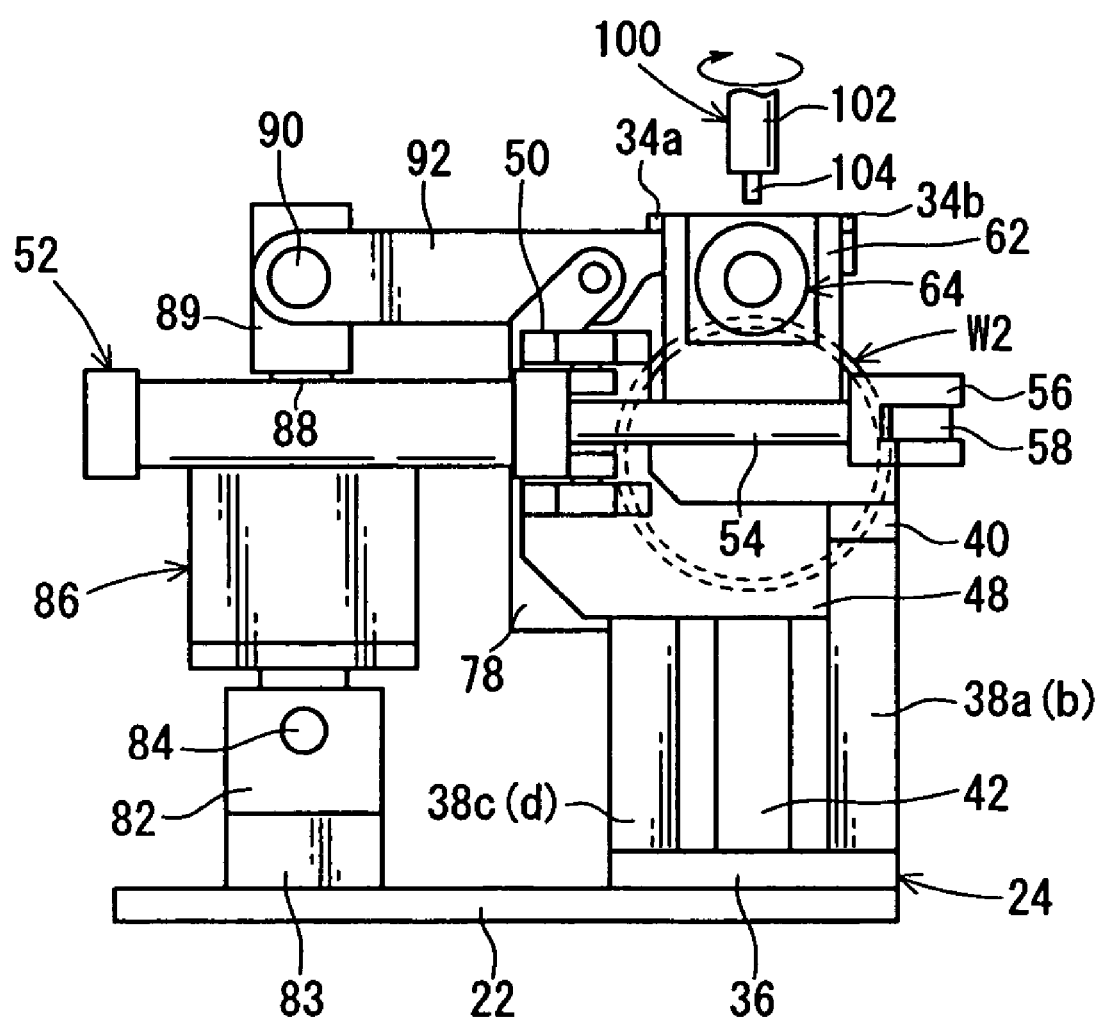
FIG. 10 is a side elevational view showing the manner in which the hollow cylindrical body is pressed from the side of the outer circumferential wall surface by a prismatic rod member.

Then, the cylinder 86 is actuated to elevate the rod 88. The first arm 92 and the second arm 94 that are coupled to the bracket 89 by the rod 90 are angularly lowered about their portions which are coupled to the first shaft engaging member 78 and the second shaft engaging member 80, respectively, by the joint rod 96. As a result, as shown in FIG. 10, the prismatic bar members 34*a*, 34*b* are brought into abutment against the outer circumferential wall surface of the hollow cylindrical body W2. Thus, the outer circumferential wall surface of the hollow cylindrical body W2 is pressed by the prismatic bar members 34*a*, 34*b*, and the inner circumferential wall surface of the hollow cylindrical body W2 is pressed by the support member 28. Stated otherwise, the hollow cylindrical body W2 is clamped between the support member 28 and the prismatic bar members 34*a*, 34*b* and hence is reliably prevented from becoming open back into a plate shape.

Then, the linear abutting regions of the hollow cylindrical body W2, i.e., the end faces 1, 2 thereof, are friction-stir-welded by the friction stir welding tool 100.

Specifically, the friction stir welding tool 100 is inserted into the gap 98 (see FIG. 6) and the rotor 102 is rotated, after which the probe 104 is held in sliding contact with the second protrusion 9 at any desired position thereon. The sliding contact produces frictional heat, softening the region of the second protrusion 9 which is contacted by the probe 104, whereupon the tip end of the probe 104 is plunged into the second protrusion 9.

Figure 11:
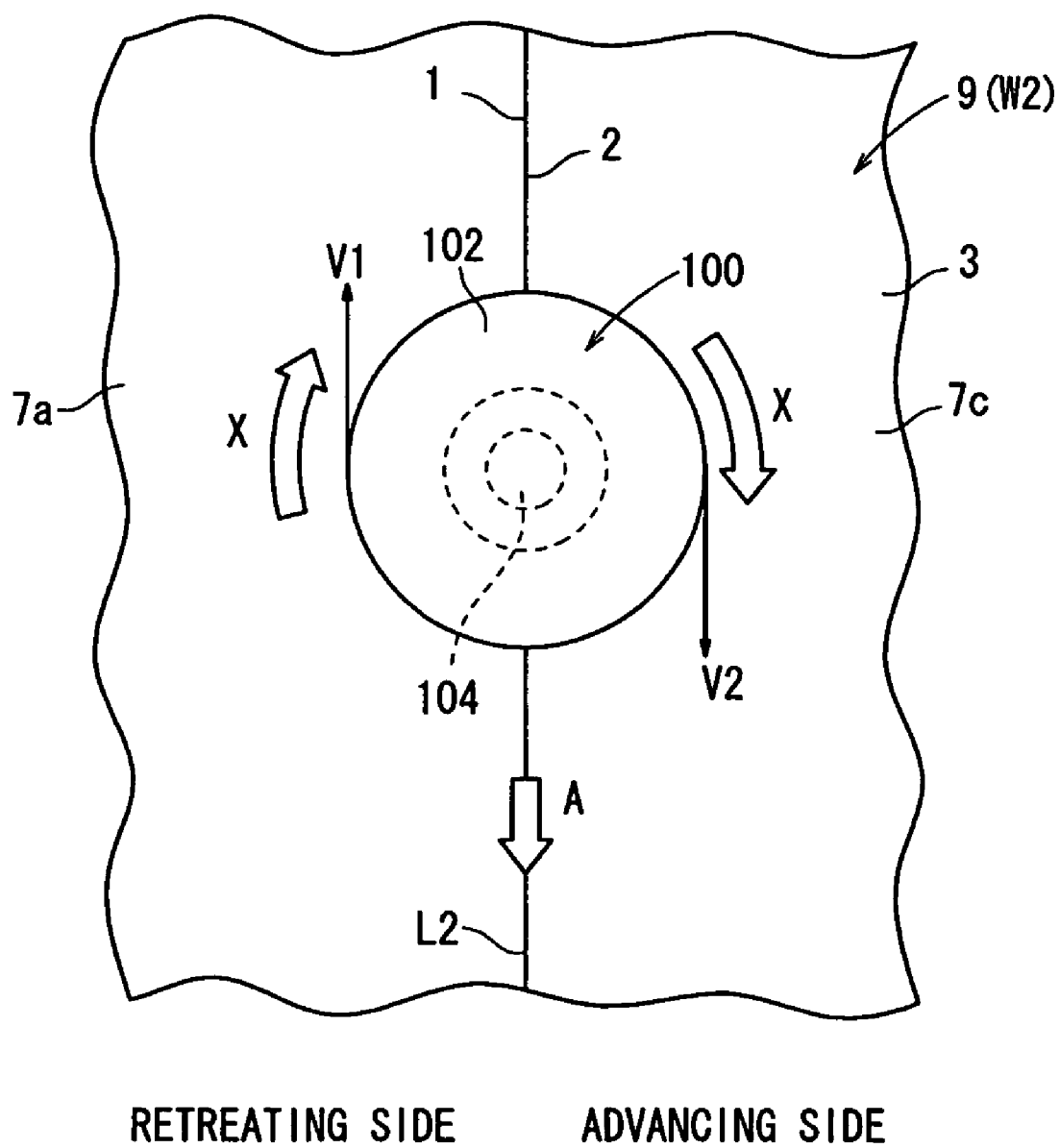
FIG. 11 is a plan view illustrating definitions of an advancing side and a retreating side.

At a left end in FIG. 11 of the hollow cylindrical body W2, the direction of a vector V1 along the rotational direction (indicated by the arrow X) at a portion of the probe 104 that is most spaced from a boundary line L2 between the end faces 1, 2 is opposite to the direction (indicated by the arrow A) in which the probe 104 is displaced. In the description which follows, the end of the hollow cylindrical body W2 where the direction of the vector V1 is opposite to the direction in which the probe 104 is displaced is referred to as "retreating side".

At a right end in FIG. 11 of the hollow cylindrical body W2, the direction of a vector V2 along the rotational direction (indicated by the arrow X) at a portion of the probe 104 that is most spaced from the boundary line L2 between the end faces 1, 2 is the same as the direction (indicated by the arrow A) in which the probe 104 is displaced. In the description which follows, the end of the hollow cylindrical body W2 where the direction of the vector V2 is the same as the direction in which the probe 104 is displaced is referred to as "advancing side".

Figure 12:
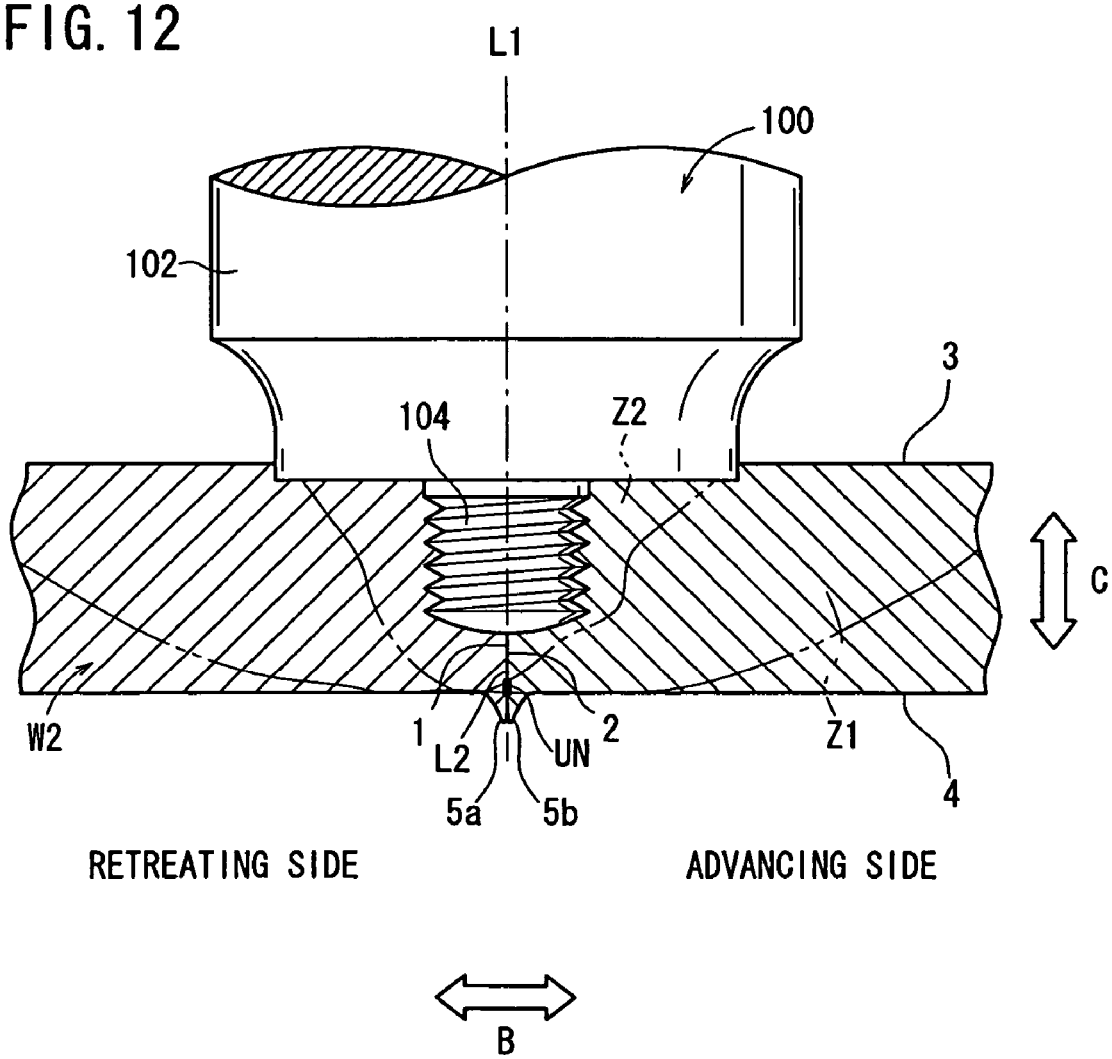
FIG. 12 is an enlarged fragmentary cross-sectional view showing the manner in which a probe is plunged into abutting regions, with the central axis thereof overlapping a boundary line formed by the abutting end faces of the workpiece.

Usually, as shown in FIG. 12, the probe 104 is plunged such that the central axis L1 of the probe 104 is aligned with the boundary line L2. At this time, the size of a stirred region Z2, i.e., the amount of material that is stirred, is greater on the retreating side than on the advancing side. Therefore, the material at the lower end along the boundary line L2 may not sufficiently be stirred, possibly with the result that an unjoined region UN remains in the material. It is inferred that the unjoined region UN remains because the material tends to cause a greater plastic flow on the retreating side than on the advancing side. In FIG. 12, the reference characters Z1 represent a region where the material is softened due to frictional heat.

Figure 13:
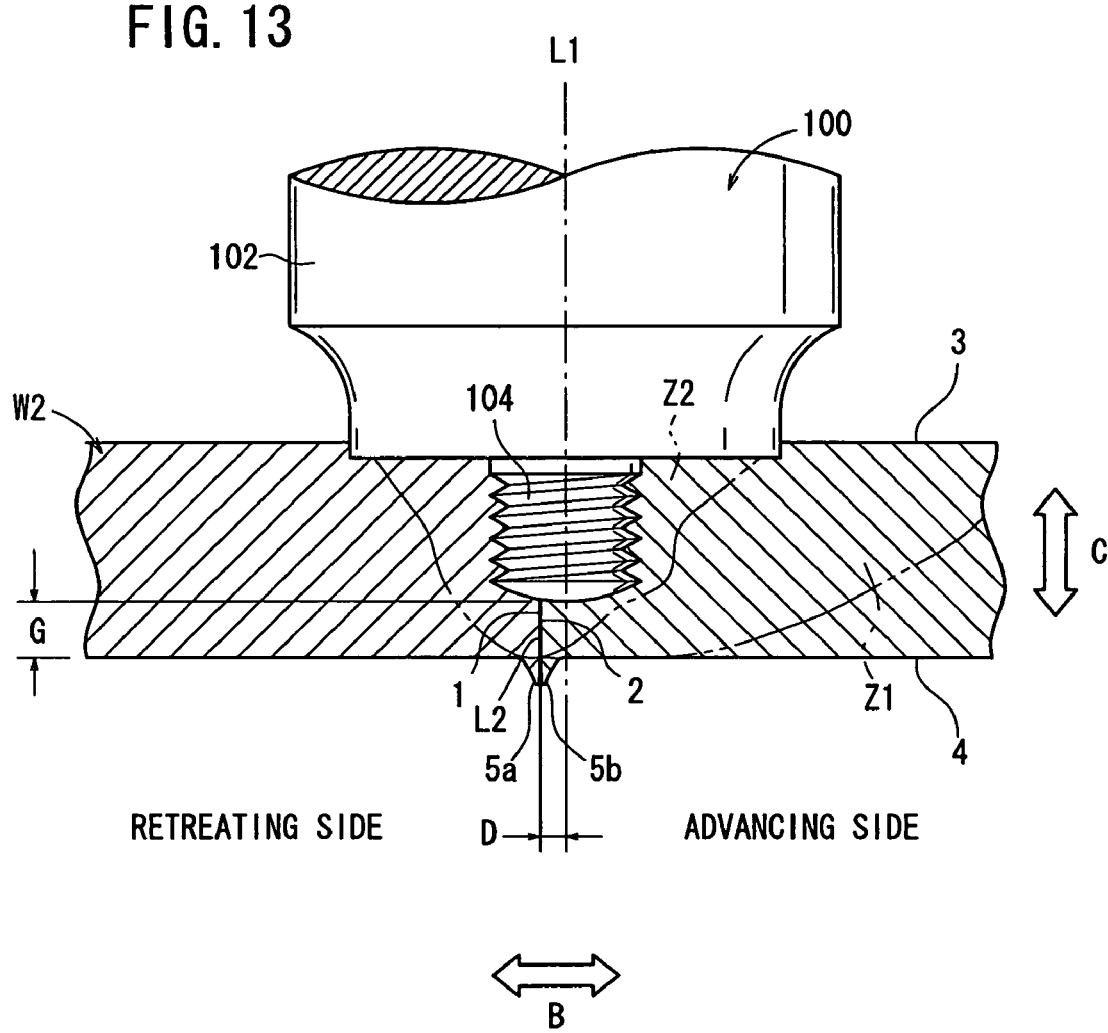
FIG. 13 is an enlarged fragmentary cross-sectional view showing the manner in which the probe is plunged into the abutting regions, with the central axis thereof being displaced from the boundary line formed by the abutting end faces of the workpiece toward the advancing side.

Therefore, as shown in FIG. 13, it is preferable that the central axis L1 of the probe 104 be displaced from the boundary line L2 between the end faces 1, 2 of the first protrusion 8 toward the advancing side. That is, the probe 104 is plunged into the abutting regions at a position displaced to the advancing side.

The distance D between the central axis L1 of the probe 104 and the boundary line L2 is set to a range equal to or smaller than the radius of the probe 104. If the distance D is set to a distance in excess of the radius of the probe 104, then during the friction stir welding process, more material is stirred on the advancing side, also resulting in an unjoined region UN that remains. The distance D should preferably be equal to or smaller than one-half of the radius of the probe 104.

The probe 104 is plunged into the abutting regions at a position displaced to the advancing side. The distance D (see FIG. 13) is set to a distance equal to or smaller than the radius of the probe 104, preferably equal to or smaller than one-half of the radius of the probe 104. In this manner, the size of the stirred region Z2 is substantially equalized on the retreating side and the advancing side. Stated otherwise, the amount of stirred material is substantially equalized on the retreating side and the advancing side.

By thus displacing the central axis L1 of the probe 104, which is in a range equal to or smaller than the radius of the probe 104, from the boundary line L1 between the end faces 1, 2 toward the advancing side, the amount of stirred material is substantially equalized on the retreating side and the advancing side. Since the stirred region Z2 reaches to the lower end (back surface 4) along the boundary line L2, an unjoined region UN (see FIG. 12) is prevented from remaining. Therefore, a joint having excellent bonding strength is obtained.

As an unjoined region UN is prevented from remaining, a gap G (see FIG. 13) is increased. The gap G may be managed so as to be equal to or less than 0.4 mm. Consequently, the managed value of the gap G is 0.3 mm greater than the gap described above. According to the friction stir welding process, even though the managed value of the gap G is only 0.3 mm greater than the conventional gap, an operation for forming the gap G is made highly easy to perform, and the time required to perform the operation is greatly reduced.

Furthermore, because the crests of the sags 6a, 6b are held in abutment against each other on the outer circumferential wall surface (see FIG. 5), the gap formed between the end faces 1, 2 on the inner circumferential wall surface is reduced, and the area of contact between the end faces 1, 2 is increased. Consequently, a large amount of material is stirred, producing a large amount of frictional heat. As a result, a large number of large cavities are prevented from being created in the joint.

While the rotor 102 is rotating, the friction stir welding tool 100 is moved toward the first protrusion 8 (see FIG. 9). The material in the softened abutting regions of the hollow cylindrical body W2 is plasticized as it is stirred by the probe 104. After the probe 104 moves away, the plasticized material is cooled and solidified into a solid-state joint. This phenomenon is successively repeated to join the abutting regions of the hollow cylindrical body W2 integrally into a solid-state joint.

When the probe 104 moves, since the hollow cylindrical body W2 is inclined with respect to the horizontal direction, the area of contact between the hollow cylindrical body W2 and the probe 104 is smaller than if the hollow cylindrical body W2 is supported horizontally. Consequently, the probe 104 suffers a lesser load.

When the friction stir welding tool 100 moves, it is gradually lowered by a tilting mechanism, not shown, at a rate commensurate with the gradient of the hollow cylindrical body W2. Thus, the probe 104 is prevented from being released from the hollow cylindrical body W2.

As described above, the hollow cylindrical body W2 has the first protrusion 8 and the second protrusion 9, the first protrusion 8 and the second protrusion 9 are gripped by the first gripping member 30 and the second gripping member 32, and the hollow cylindrical body W2 is gripped by the support member 28 and the prismatic bar members 34a, 34b. Therefore, the hollow cylindrical body W2 is reliably prevented from being opened back into the plate-like workpiece W1, allowing the friction stir welding process to be performed with ease.

According to the friction stir welding process, the butting regions can be joined without forming swellings, and hence the welded hollow cylindrical body does not need to be finished. Consequently, it is possible to manufacture a wheel rim of good appearance efficiently.

After the hollow cylindrical body W2, which serves as a preform for a wheel rim, is fabricated by the friction stir welding process, the cylinder 86 is actuated to lower the rod 88, spacing the prismatic bar members 34a, 34b away from the hollow cylindrical body W2. The cylinder 52 is actuated to retract the rod 54 backward, turning the support member 28, and the cylinder 64 is actuated to retract the rod 66, spacing the second gripping member 32 away from the second protrusion 9. The hollow cylindrical body W2 with the first protrusion 8 and the second protrusion 9 can now be removed from the friction stir welding apparatus 20.

After the hollow cylindrical body W2 is released from the support member 28, the first protrusion 8 and the second protrusion 9 are cut off, whereupon a wheel rim in the form of the hollow cylindrical body W2 is produced.

A friction stir welding apparatus according to a second embodiment will be described below.

Figure 14:
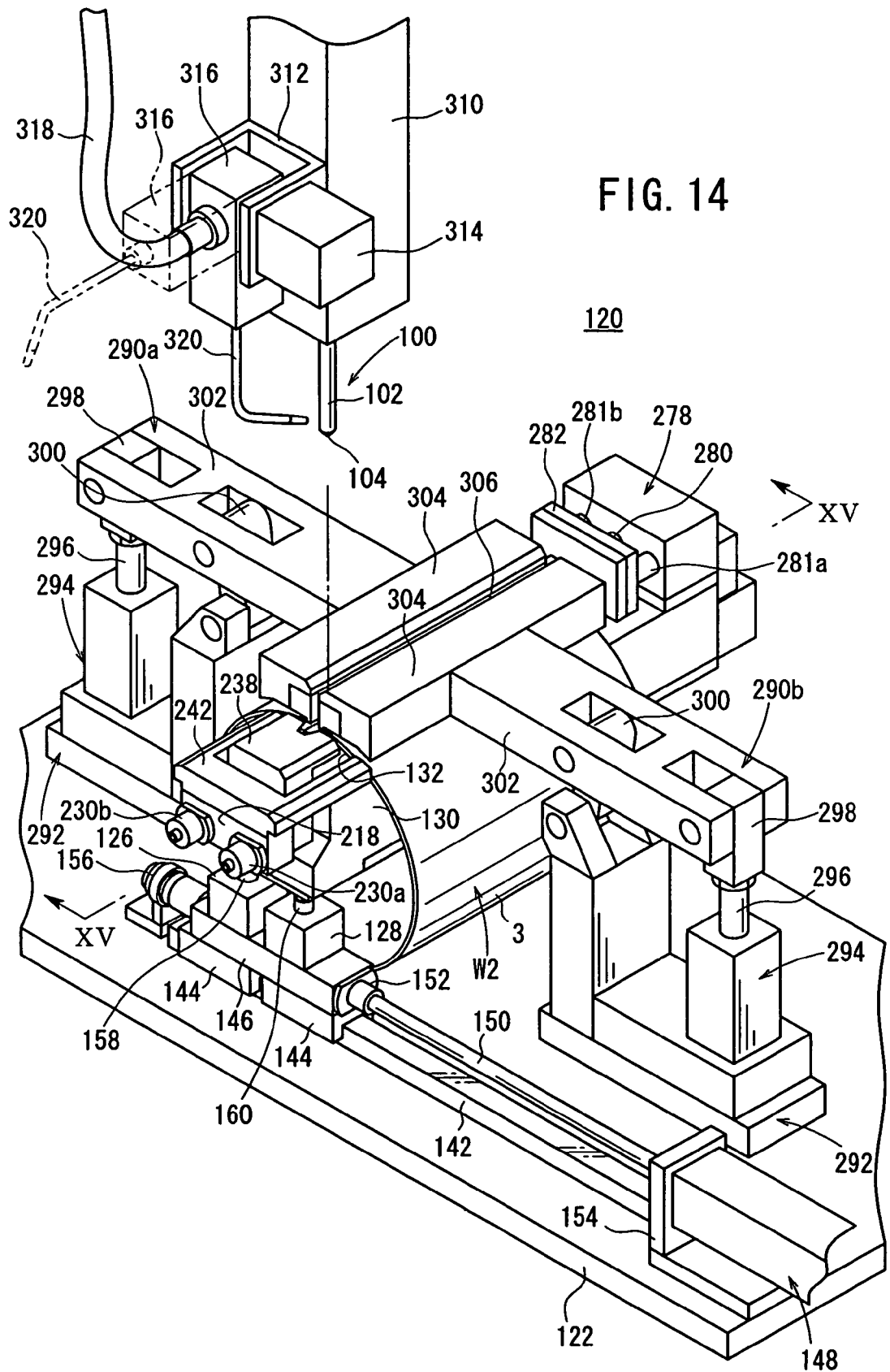
FIG. 14 is a perspective view of a friction stir welding apparatus according to a second embodiment.
Figure 15:
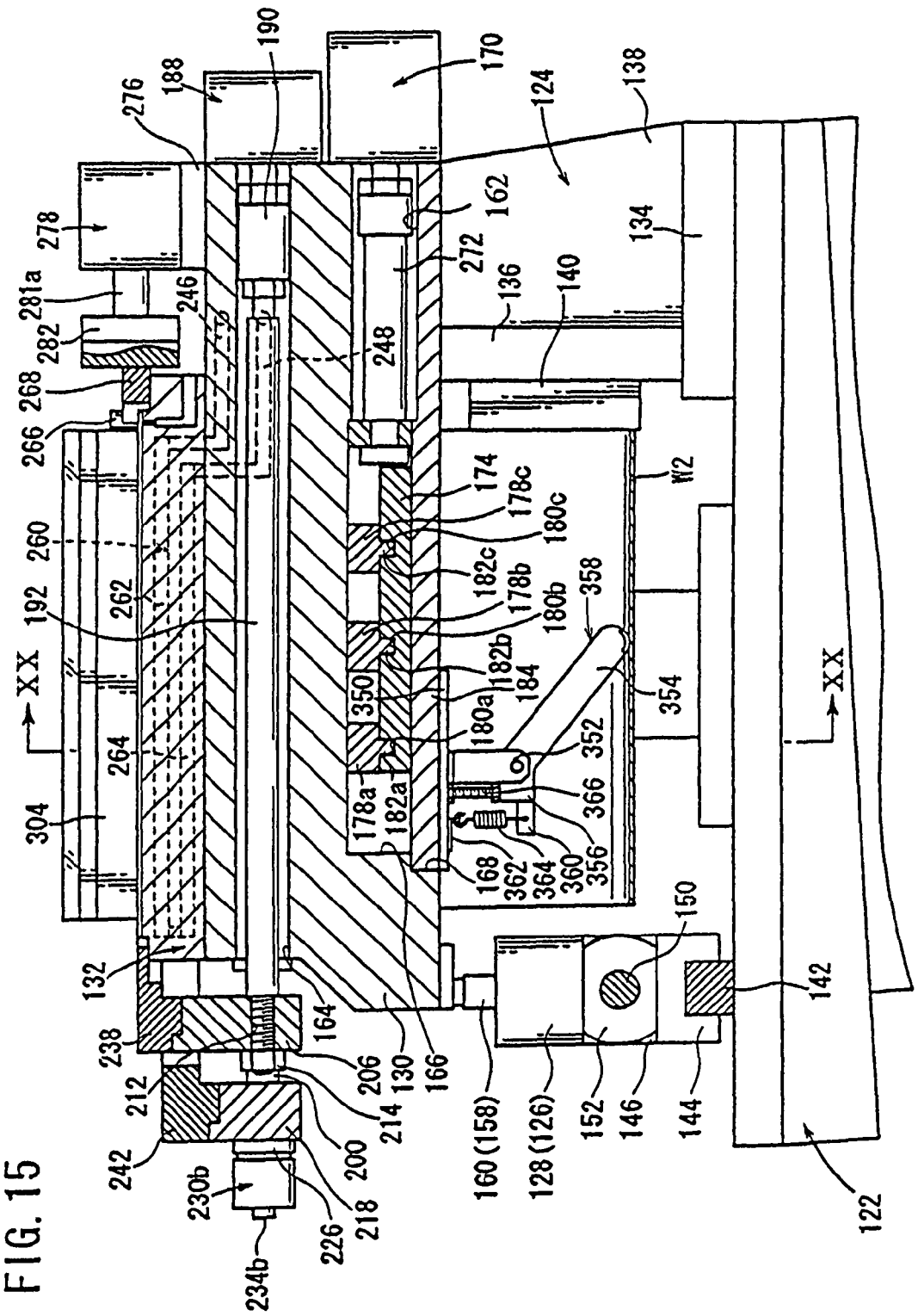
FIG. 15 is a cross-sectional view taken along line XV-XV of FIG. 14.

FIG. 14 is a perspective view of the friction stir welding apparatus according to the second embodiment, and FIG. 15 is a is a cross-sectional view taken along line XV-XV of FIG. 14. As shown in FIGS. 14 and 15, the friction stir welding apparatus 120 comprises a base 122 having a slightly slanted bottom (see FIG. 15), a columnar member 124 as a first support means, a first support natural lock cylinder 126 and a second support natural lock cylinder 128 as a second support means, a support body 130 supported by the columnar member 124, the first support natural lock cylinder 126, and the second support natural lock cylinder 128, for holding various means, and a support core 132 placed on and coupled to an upper end face of the support body 130.

Each of the first support natural lock cylinder 126 and the second support natural lock cylinder 128 is a support having a means for smoothly locking a plunger under hydraulic pressure.

As shown in FIG. 15, the columnar member 124 that is vertically mounted on the base 122 has a bottom board 134 and an upstanding column board 136 that are combined into a substantially L-shaped assembly, the upstanding column board 136 being supported by a support board 138. A stopper 140 is coupled to the upstanding column board 136.

Figure 16:
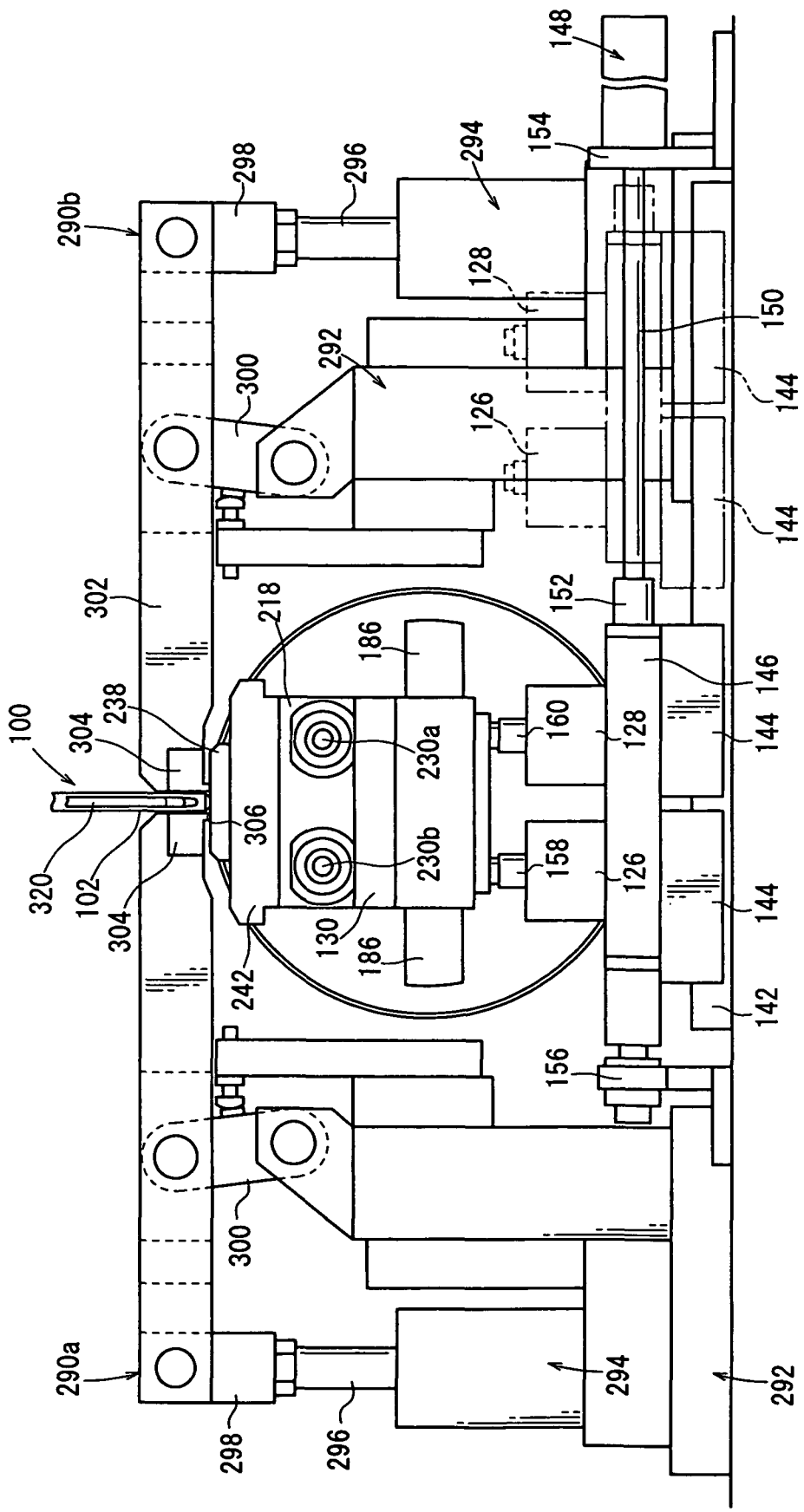
FIG. 16 is a front elevational view of the friction stir welding apparatus shown in FIG. 14.

As shown in FIGS. 14 through 16, a rail 142 is laid on the base 122. The first support natural lock cylinder 126 and the second support natural lock cylinder 128 are movable along the rail 142.

Specifically, the rail 142 engages in engaging grooves defined in engaging brackets 144 (see FIG. 14), and a positioning bracket 146 is fixedly mounted on the engaging brackets 144. A housing bracket 152, which is irremovably mounted on the head of a piston rod 150 of a displacement cylinder 148, is fixedly positioned on one side face of the positioning bracket 146. The first support natural lock cylinder 126 and the second support natural lock cylinder 128 are fixedly coupled to the positioning bracket 146. Therefore, when the piston rod 150 of the displacement cylinder 148 is moved forward and backward, the first support natural lock cylinder 126 and the second support natural lock cylinder 128 are displaced while being guided by the rail 142.

The displacement cylinder 148 is supported by a substantially L-shaped support board 154 coupled to the base 122. A stop board 156 is mounted on the base 122 in a position confronting the displacement cylinder 148. When the positioning bracket 146 reaches a predetermined position, the positioning bracket 146 and hence the first support natural lock cylinder 126 and the second support natural lock cylinder 128 are prevented from being further displaced by the stop board 156.

The first support natural lock cylinder 126 and the second support natural lock cylinder 128 have respective support rods 158, 160 that can be lifted toward and lowered away from the support body 130.

As shown in FIG. 15, the support body 130 has a first insertion hole 162 and a second insertion hole 164 that are defined longitudinally therein. The support body 130 also has a cam insertion slot 166 which communicates with the first insertion hole 162 and is wider than the first insertion hole 162, the cam insertion slot 166 having a closed end. The bottom of the support body 130 is partly cut off, providing a recess 168 communicating with the cam insertion slot 166. The recess 168 has a width greater than the cam insertion slot 166.

A horizontal pressing cylinder 170 serving as a first pressing means for horizontally pressing the inner circumferential wall surface of the hollow cylindrical body W2 is fixedly coupled to an end of the support body 130. The horizontal pressing cylinder 170 has a piston rod 172 that is inserted, together with a cam 174 shown in FIG. 17, in the first insertion hole 162. A bushing (not shown) is interposed between the piston rod 172 and the support body 130.

Figure 17:
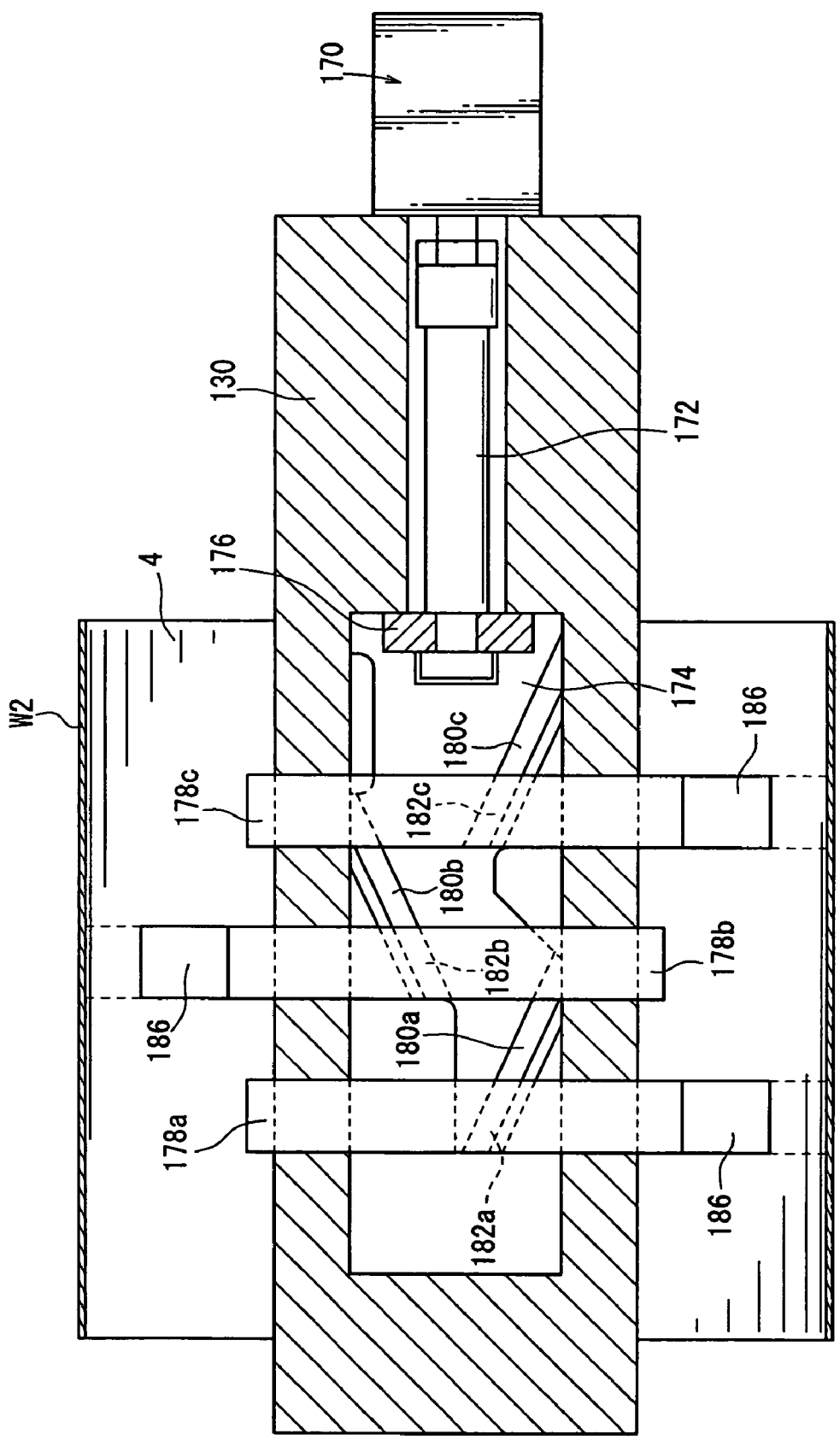
FIG. 17 is a plan view of a horizontal pressing cylinder, a cam, and a small rod for pressing the inner circumferential wall of the hollow cylindrical body.

As shown in FIG. 17, the head of the piston rod 172 is coupled to the cam 174 by a coupling annular member 176. As described later, as the piston rod 172 moves forward and backward, the cam 174 causes small rods 178a through 178c to move forward and backward in directions perpendicular to the directions in which the piston rod 172 moves forward and backward.

The cam 174 has engaging grooves 180a through 180c defined in its upper surface which are inclined at given angles with respect to the longitudinal direction of the cam 174. The small rods 178a through 178c have respective teeth 182a through 182c disposed on their bottom surfaces and held in sliding engagement in the engaging grooves 180a through 180c (see FIG. 15).

The cam 174 is held in the support body 130 by a holder 184 inserted in the recess 168 and coupled to the support body 130.

As shown in FIG. 15, a flat-plate bracket 350 is fixedly coupled to the holder 184. A stay 352 extending vertically downwardly is fixed to the flat-plate bracket 350. A vertical pressing arm 358 (second pressing means) has a longer member 354 having a round head and a shorter member 356 bent and extending horizontally from the longer member 354. The vertical pressing arm 358 has its bent corner pivotally coupled to the stay 352. Therefore, the vertical pressing arm 358 is angularly movable about its own bent corner pivotally coupled to the stay 352. The head of the longer member 354 of the vertical pressing arm 358 is held in abutment against the inner circumferential wall surface of the hollow cylindrical body W2.

An L-shaped stay 362 is mounted on the holder 184 at a position confronting a columnar projection 360 that extends horizontally from the bent corner of the vertical pressing arm 358. The columnar projection 360 and the L-shaped stay 362 have respective through holes defined therein, and a helical spring 364 has hooks engaging in these through holes, respectively. The helical spring 364 normally biases the columnar projection 360 vertically upwardly under its compressive forces. As the columnar projection 360 is pulled upwardly, the vertical pressing arm 358 is resiliently urged to move toward the inner circumferential wall surface of the hollow cylindrical body W2 about the bent corner of the vertical pressing arm 358. As a result, the head of the longer member 354 of the vertical pressing arm 358 is pressed downwardly against the inner circumferential wall surface of the hollow cylindrical body W2.

The vertical pressing arm 358 is limited against its angular movement by a stopper screw 366 held against the shorter member 356. Therefore, the vertical pressing arm 358 is prevented from pressing the inner circumferential wall surface of the hollow cylindrical body W2 under excessive forces.

Pressers 186 are fastened to the respective distal ends of the small rods 178a through 178c by bolts, not shown (see FIG. 17). The pressers 186 have respective tip ends curved complementarily in shape to the inner circumferential wall surface of the hollow cylindrical body W2.

The second insertion hole 164 extends longitudinally through the support body 130 (see FIG. 15). An aligning cylinder 188 fixedly coupled to a right end face, as seen in FIG. 15, of the support body 130 has a piston rod 190 including a universal joint and inserted in the second insertion hole 164.

An elongate floating rod 192 has an end coupled to the head of the piston rod 190. The other end of the floating rod 192 projects from the second insertion hole 164.

Figure 18:
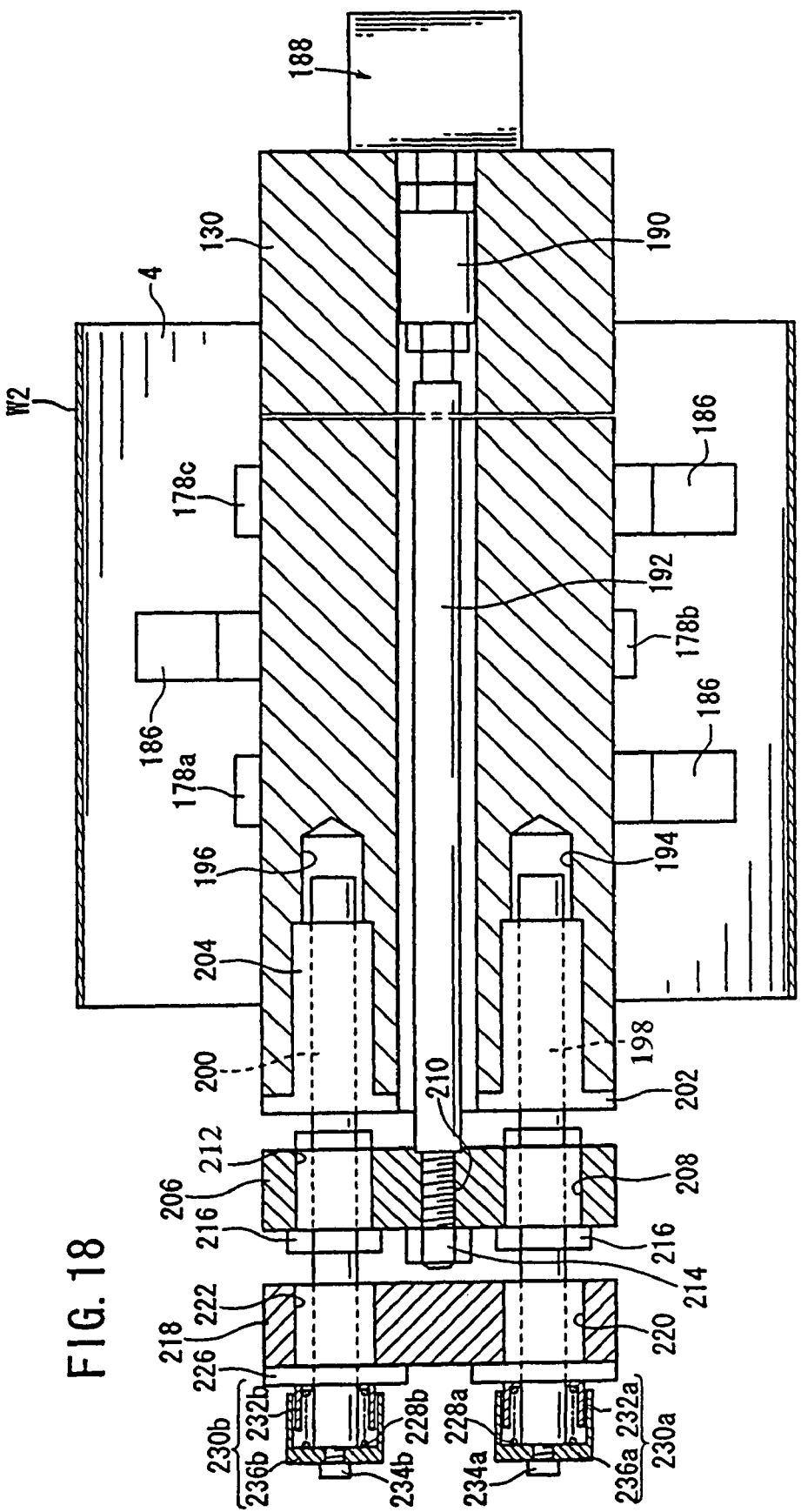
FIG. 18 is a horizontal plan view of an aligning cylinder, a floating rod, a joint member and a placement joint member connected to the support body extending through the hollow cylindrical body.

As shown in FIG. 18, the support body 130 has a first rod insertion small hole 194 and a second rod insertion small hole 196 that are defined in an end of the support body 130 on opposite sides of the second insertion hole 164. A first large rod 198 and a second large rod 200 are inserted respectively in the first rod insertion small hole 194 and the second rod insertion small hole 196.

Bearings (not shown) are interposed between the support body 130 and the first and second large rods 198, 200. The bearings are sealed by a first cap 202 and a second cap 204 that are fitted respectively in the first rod insertion small hole 194 and the second rod insertion small hole 196.

A joint member 206 is held against the end face of the head of the floating rod 192. The joint member 206 has a first through hole 208, a second through hole 210, and a third through hole 212 that are defined therein. A bolt 214 extends through the central second through hole 210 and is threaded into the head of the floating rod 192.

The first large rod 198 and the second large rod 200 extend respectively through the first through hole 208 and the third through hole 212, so that the floating rod 192 and the first and second large rods 198, 200 are coupled to each other by the joint member 206. The first large rod 198 and the second large rod 200 are prevented from being removed from the first through hole 208 and the third through hole 212 by annular stoppers 216. The floating rod 192 is prevented from being removed from the second through hole 210 by the end face of the head of the floating rod 192 and a bolt 214.

A placement joint member 218, which has a vertical dimension shown in FIG. 15 slightly smaller than the joint member 206, extends between and is mounted on portions of the first large rod 198 and the second large rod 200 which extend from the first through hole 208 and the third through hole 212 in the joint member 206. Specifically, as shown in FIG. 18, the placement joint member 218 has a fourth through hole 220 and a fifth through hole 222 through which the first large rod 198 and the second large rod 200 extend, respectively. Bearings (not shown) are interposed between the placement joint member 218 and the first large rod 198 and the second large rod 200. The bearings are sealed by a third cap 224 and a fourth cap 226 that are fitted respectively in the fourth through hole 220 and the fifth through hole 222.

The first large rod 198 and the second large rod 200 extend further from the fourth through hole 220 and the fifth through hole 222, respectively, in the placement joint member 218. Casings 230a, 230b housing respective helical springs 228a, 228b are mounted on respective distal ends of the first large rod 198 and the second large rod 200.

The casings 230a, 230b have respective hollow cylindrical bodies 232a, 232b fitted over respective circumferential side walls of the first large rod 198 and the second large rod 200 and having respective open ends, and respective hollow cylindrical covers 236a, 236b coupled to the respective heads of the first large rod 198 and the second large rod 200 by bolts 234a, 234b and having respective open ends. The hollow cylindrical covers 236a, 236b have respective circumferential side walls surrounding the respective circumferential side walls of the hollow cylindrical bodies 232a, 232b. The helical springs 228a, 228b have ends seated on the bottom surfaces of the hollow cylindrical bodies 232a, 232b and the top surfaces of the hollow cylindrical covers 236a, 236b.

A first gripping member 238 is fixedly coupled to an upper end face of the joint member 206 (see FIG. 15). The first gripping member 238 has a recess 240 defined therein which is complementary in shape to the second protrusion 9. A substantially channel-shaped aligning presser member 242 is mounted on an upper end face of the placement joint member 218 (see FIGS. 15 and 19). The aligning presser member 242 is disposed in surrounding relation to the first gripping member 238 and has a distal end projecting beyond the distal end of the first gripping member 238. When the hollow cylindrical body W2 is set in place, the distal end of the aligning presser member 242 contacts the hollow cylindrical body W2 earlier than the distal end of the first gripping member 238.

As described later, when the piston rod 190 (see FIG. 15) is moved, the first gripping member 238 and the aligning presser member 242 are displaced by the floating rod 192, the first large rod 198, and the second large rod 200.

Figure 20:
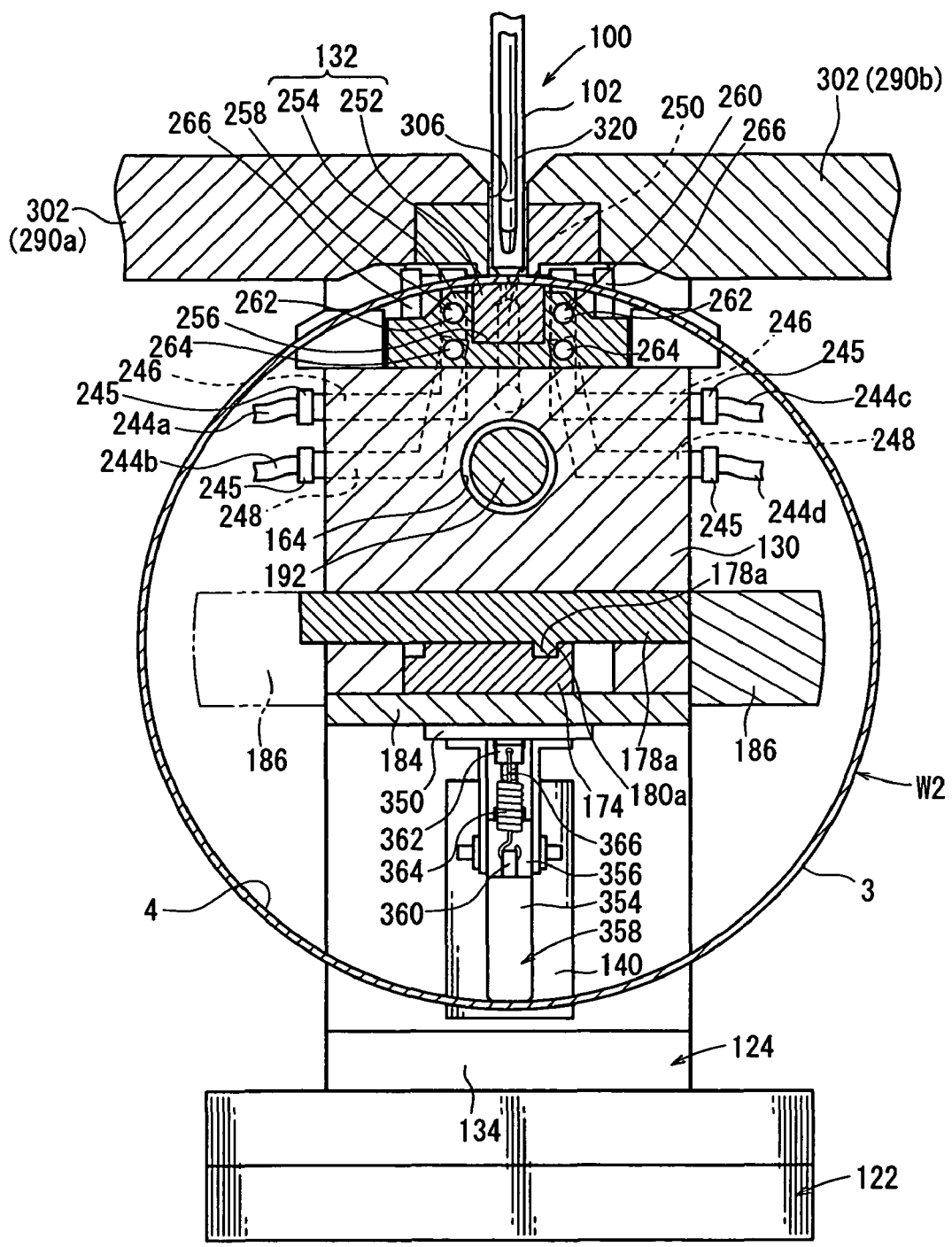
FIG. 20 is a cross-sectional view taken along line XX-XX of FIG. 15.
Figure 21:
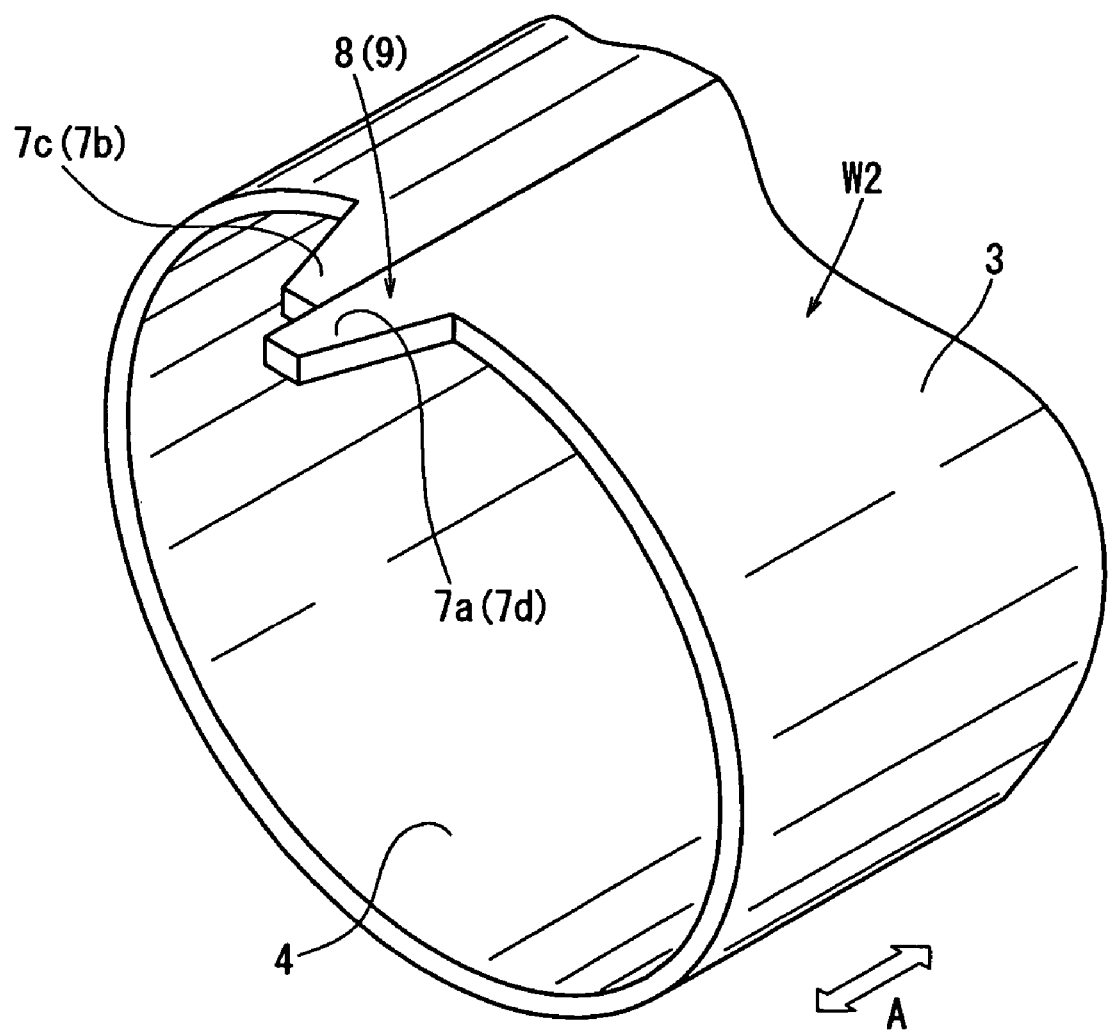
FIG. 21 is an enlarged fragmentary perspective view showing the manner in which the end faces of the protrusion of the hollow cylindrical body shown in FIG. 3 are positionally displaced from each other along the direction in which the end faces are joined.

As shown in FIG. 20, which is a cross-sectional view taken along line XX-XX of FIG. 15, four tubes 244a through 244d for passing cooling water therethrough are connected by pipe joints 245 to a right end portion of the support body 130 as seen in FIG. 15, i.e., an end portion of the support body 130 to which the aligning cylinder 188 and the horizontal pressing cylinder 170 are fixedly connected. The support body 130 has cooling water inlet passages 246 defined therein for introducing the cooling water and cooling water outlet passages 248 defined therein for discharging the cooling water. The support body 130 also has an air passage 250 defined therein that is connected to a compressed air tube (not shown) by a pipe joint.

The support core 132 which is fixedly positioned on the upper end face of the support body 130 comprises a first core member 252 and a second core member 254. The inner circumferential wall surface of the hollow cylindrical body W2 abuts against a curved upper surface of the first core member 252, supporting the hollow cylindrical body W2 on the friction stir welding apparatus 120.

The second core member 254 is placed on and coupled to an upper end face of the support body 130. The second core member 254 has a slanted land disposed on an upper end face thereof. The land has an insertion groove 256 defined therein which extends in the longitudinal direction of the support body 130.

The second core member 254 has a first passage 258 and a second passage 260 defined therein respectively on the opposite sides of the insertion groove 256 (see FIG. 15). The first passage 258 and the second passage 260 have upper passageways 262 extending from the right end to left end in FIG. 15 of the second core member 254, and lower passageways 264 disposed below the upper passageways 262 and communicating with the upper passageways 262 in the left end in FIG. 15 of the second core member 254. The lower passageways 264 extend from the left end to right end in FIG. 15 of the second core member 254.

The upper passageways 262 of the first passage 258 and the second passage 260 communicate with the cooling water inlet passages 246, and the lower passageways 264 of the first passage 258 and the second passage 260 communicate with the cooling water outlet passages 248. Therefore, the cooling water flows through the first passage 258 and the second passage 260.

Figure 19:
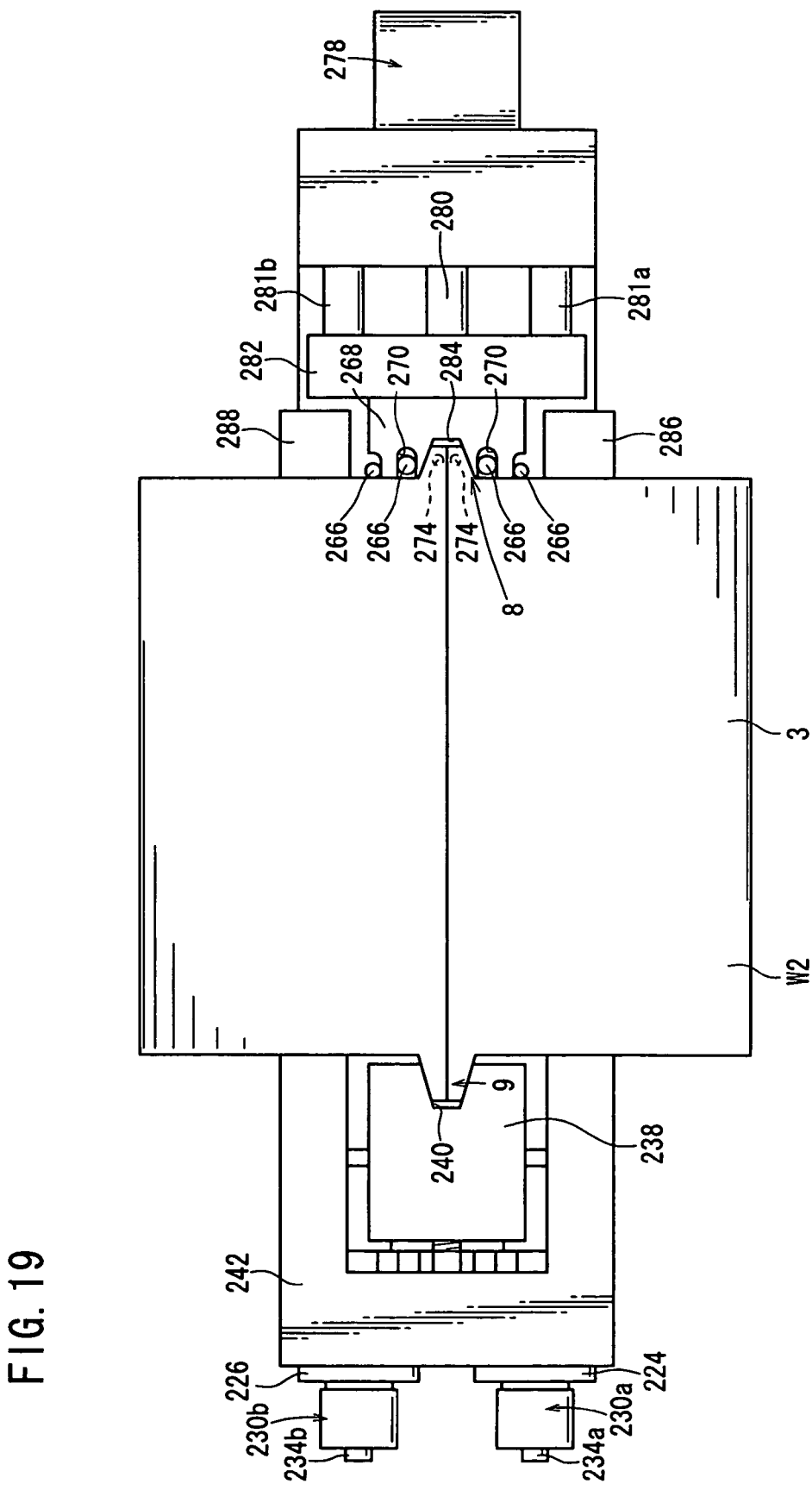
FIG. 19 is a plan view of the friction stir welding apparatus shown in FIG. 14.

Four upstanding pins 266 are mounted on the upper end face of the second core member 254 at confronting positions across the insertion groove 256 near the right end portion in FIGS. 15 and 19 of the second core member 254. The inner two of the pins 266 enter curved recesses 270 defined in the second gripping member 268.

The first core member 252 is inserted and fixedly positioned in the insertion groove 256 defined in the second core member 254. The first core member 252 has air ejection ports 274 defined therein near the pins 266 and held in communication with the air passage 250 defined in the second core member 254.

The first core member 252 having the curved upper surface, and the second core member 254 having the first passage 258 and the second passage 260 for passing the cooling water therethrough are separate from each other. Therefore, the first core member 252 and the second core member 254 can easily be fabricated.

The pressure of air ejected from the air ejection ports 274 is monitored at all times by a first pressure sensor, not shown. The pressure of compressed air in the vicinity of the first finger 7a and the third finger 7c of the hollow cylindrical body W2 is also monitored by a second pressure sensor. The pressures of compressed air that are monitored by the second pressure sensor and the first pressure sensor are compared with each other to judge whether the first finger 7a and the third finger 7c are spaced from each other or held in abutment against each other.

As shown in FIGS. 15 and 19, a gripping cylinder 278 is placed on the right end of the upper end face of the support body 130 with a fixed board 276 interposed therebetween. The gripping cylinder 278 has a piston rod 280 and two guide members 281a, 281b (see FIG. 19). A presser board 282 is mounted on the piston rod 280. The second gripping member 268 is coupled to the presser board 282.

As described above, the curved recesses 270 are defined in the distal end of the second gripping member 268 in alignment with the pins 266. The second gripping member 268 also has a recess 284 defined therein which is complementary in shape to the first protrusion 8.

A first aligning board 286 and a second aligning board 288 are fixedly positioned on the right end of the upper end face of the support body 130 in FIG. 19 at respective positions that confront each other across the second core member 254.

The friction stir welding apparatus 120 also has, in addition to the above means, a first presser stop means 290a and a second presser stop means 290b for pressing the hollow cylindrical body W2 to a stop. The first presser stop means 290a comprises a vertically movable cylinder 294 fixedly mounted on an upper end face of a flat portion of the support board 292, an arm 302 coupled to a piston rod 296 of the vertically movable cylinder 294 and an upper end of a columnar portion of the support board 292 by respective links 298, 300, and a presser stop 304 mounted on the distal end of the arm 302. The presser stop 304 has a longitudinal dimension that is essentially the same as the dimension of the hollow cylindrical body W2 in the longitudinal direction B (see FIG. 14).

The second presser stop means 290b is identical in structure to the first presser stop means 290a. Those parts of the second presser stop means 290b which are identical to those of the first presser stop means 290a are denoted by identical reference characters, and will not be described in detail below.

When the presser stops 304 of the first and second presser stop means 290a, 290b press the hollow cylindrical body W2 to a stop, a gap 306 is created between the presser stops 304. The friction stir welding tool 100 for welding the abutting end faces of the hollow cylindrical body W2 is inserted in the gap 306.

As described above, the friction stir welding tool 100 has the rotor 102 (see FIG. 14) fixed to a spindle, not shown, and the probe 104 mounted on the tip end of the rotor 102. The spindle is housed in a spindle cover 310.

A stay 312 is mounted on a side face of the spindle cover 310, and a rotary actuator 314 is fixedly supported on the stay 312. The stay 312 has a recess holding therein a box-shaped joint 316 having a passage (not shown) defined therein. To the joint 316, there are connected an air inlet tube 318 for delivering compressed cooling air that is to be ejected toward the rotor 102, and a cooling air outlet tube 320.

The friction stir welding apparatus 120 according to the second embodiment is basically constructed as described above. Operation and advantages of the friction stir welding apparatus 120 will be described below.

Prior to a friction stir welding process, the friction stir welding apparatus 120 is supplied with a cooling water through the tubes 244a, 244c.

The supplied cooling water is introduced through the cooling water inlet passages 246 defined in the support body 130 (see FIG. 15) into the upper passageways 262 of the first passage 258 and the second passage 260 in the second core member 254. The cooling water flows from the right end to left end in FIG. 15 of the second core member 254, then flows into the lower passageways 264, and flows through the lower passageways 264 from the left end to right end in FIG. 15 of the second core member 254.

The cooling water that has flowed through the lower passageways 264 flows through the cooling water outlet passages 248 defined in the support body 130 (see FIG. 15), and is then discharged out of the friction stir welding apparatus 120 through the tubes 244b, 244d.

The friction stir welding apparatus 120 is also supplied with compressed air via the non-illustrated compressed air tube. The compressed air passes through the air passage 250 defined in the support body 130 and the second core member 254, and is discharged from the air ejection ports 274 defined in the first core member 252.

After the cooling water and the compressed air have been introduced into the second core member 254, the support core 132 (see FIGS. 14 and 15) is threaded through the hollow cylindrical body W2 having the first protrusion 8 and the second protrusion 9 (see FIG. 3), with the second protrusion 9 being positioned ahead. The hollow cylindrical body W2 is placed on the support core 132, bringing the inner circumferential wall surface of the hollow cylindrical body W2 into abutment against the curved upper surface of the first core member 252 of the support core 132.

The support core 132 has its longitudinal axis parallel to the direction in which the friction stir welding tool 100 is displaced. Therefore, the hollow cylindrical body W2 can be set in place along the direction in which the friction stir welding tool 100 is displaced. Since the hollow cylindrical body W2 does not need to be positioned in alignment with the direction in which the friction stir welding tool 100 is displaced after the hollow cylindrical body W2 is set on the support core 132, the friction stir welding process can quickly be performed.

The hollow cylindrical body W2 is displaced along the support core 132 until a lower portion of one end face of hollow cylindrical body W2 abuts against the stopper and an upper portion of the end face thereof abuts against the first aligning board 286 and the second aligning board 288.

When the hollow cylindrical body W2 is displaced, the vertical pressing arm 358 is angularly moved about its bent corner as the helical spring 364 is extended. Accordingly, the vertical pressing arm 358 does not press the inner circumferential wall surface of the hollow cylindrical body W2 to a stop. Stated otherwise, the vertical pressing arm 358 does not prevent the hollow cylindrical body W2 from being set in the friction stir welding apparatus 120.

After the hollow cylindrical body W2 is displaced, the vertical pressing arm 358 is angularly moved about its bent corner as the helical spring 364 is contracted. The vertical pressing arm 358 returns to its original position.

Then, the displacement cylinder 148 actuated to move the piston rod 150 forward. The positioning bracket 146 is pressed thereby, displacing the engaging brackets 144 and hence the first support natural lock cylinder 126 and second support natural lock cylinder 128 while being guided by the rail 142.

When the engaging brackets 144 are displaced from the broken-line position to the solid-line position in FIG. 16, the positioning bracket 146 abuts against the stop board 156. The first support natural lock cylinder 126 and second support natural lock cylinder 128 are prevented from being further displaced, and positioned in a given location below the support body 130.

Because the support rods 158, 160 of the first support natural lock cylinder 126 and second support natural lock cylinder 128 are positioned in the lower dead center when these cylinders are displaced, the support rods 158, 160 do not abut against the support body 130. As the second support means are provided by the first support natural lock cylinder 126 and the second support natural lock cylinder 128, abutment of the support rods 158, 160 against the support body 130 is avoided.

Then, the first support natural lock cylinder 126 and the second support natural lock cylinder 128 are actuated to move the support rods 158, 160 forward to the support body 130. Specifically, the support rods 158, 160 are displaced upwardly in FIG. 16, supporting the support body 130 from below. The support body 130 and hence the hollow cylindrical body W2 are supported at their opposite ends by the columnar member 124 and the first support natural lock cylinder 126 and the second support natural lock cylinder 128.

Then, the vertically movable cylinders 294 of the first presser stop means 290a and the second presser stop means 290b (see FIG. 14) are actuated to elevate the piston rods 296. The arms 302 are tilted toward the hollow cylindrical body W2 about their portions joined to the links 298, 300 until finally the presser stops 304 abut against the outer circumferential wall surface of the hollow cylindrical body W2 (see FIGS. 15, 16, and 20).

Thereafter, the pressure applied to the piston rods 296 is reduced, and the presser stops 304 are pressed under a reduced pressing force against the outer circumferential wall surface of the hollow cylindrical body W2. Finally, the resilient biasing force of the helical spring 364 becomes greater than the pressing force of the presser stops 304.

Figure 22:
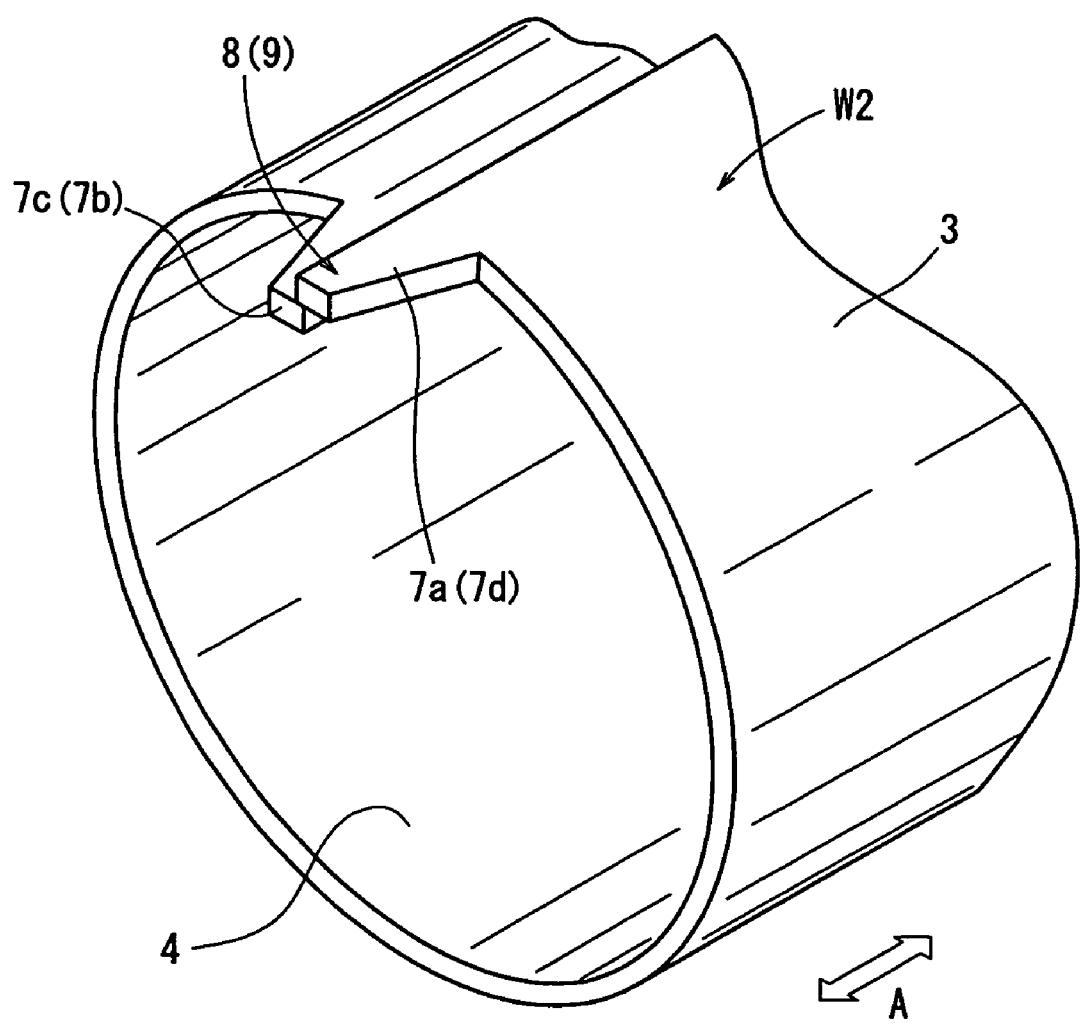
FIG. 22 is an enlarged fragmentary perspective view showing the manner in which the end faces of the protrusion of the hollow cylindrical body shown in FIG. 3 overlap each other.
Figure 23:
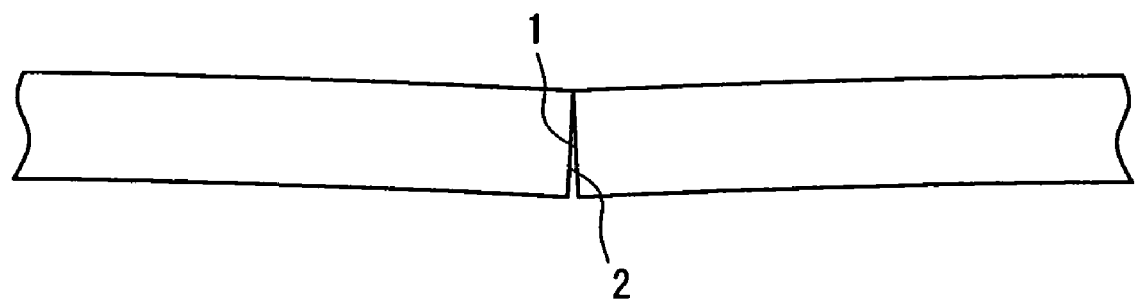
FIG. 23 is an enlarged fragmentary perspective view showing the manner in which the end faces of a hollow cylindrical body are positionally displaced from each other along the vertical direction.

The upper inner circumferential wall surface of the hollow cylindrical body W2 is now placed on the support core 132, and the lower inner circumferential wall surface of the hollow cylindrical body W2 is pressed by the head of the longer member 354 of the vertical pressing arm 358. Since the resilient biasing force of the helical spring 364 is greater than the pressing force of the presser stops 304 that are placed on the outer circumferential wall surface of the hollow cylindrical body W2, as described above, the hollow cylindrical body W2 is slightly stretched vertically downwardly. Therefore, the hollow cylindrical body W2 is prevented from being deformed into a horizontally elongate elliptical cross-sectional shape. As shown in FIG. 22, if the first finger 7a and the third finger 7c or the second finger 7b and the fourth finger 7d overlap each other, these fingers are slightly corrected out of the overlapping state as the hollow cylindrical body W2 is stretched as described above.

Then, the horizontal pressing cylinder 170 (see FIG. 15) is actuated to move the piston rod 172 forward. In response to the forward movement of the piston rod 172, the cam 174 (see FIG. 17) coupled to the head of the piston rod 172 is moved forward.

When the cam 174 is moved forward, the engaging grooves 180a through 180c in the upper surface of the cam 174 are displaced to press the teeth 182a through 182c that engage in the engaging grooves 180a through 180c. The teeth 182a through 182c slide while being guided by the engaging grooves 180a through 180c, causing the small rods 178a through 178c to move forward and backward in the directions perpendicular to the directions in which the cam 174 is moved forward, as indicated by the broken lines in FIG. 17. Finally, the pressers 186 fastened to the respective distal ends of the small rods 178a through 178c are pressed horizontally against the inner circumferential wall surface of the hollow cylindrical body W2.

When the hollow cylindrical body W2 is thus pressed, the diameter of the hollow cylindrical body W2 is slightly increased. Stated otherwise, the abutting end faces of the hollow cylindrical body W2 are slightly spaced from each other. If the first finger 7a and the third finger 7c of the hollow cylindrical body W2 or the second finger 7b and the fourth finger 7d of the hollow cylindrical body W2 overlap each other (see FIG. 22), then they are brought out of the overlapping state as the abutting end faces are slightly spaced from each other. Since the hollow cylindrical body W2 is horizontally stretched, the hollow cylindrical body W2 is prevented from being deformed into a vertically elliptical cross-sectional shape.

After the overlapping state is eliminated, the piston rod 172 (see FIGS. 15 and 17) is retracted to retract the pressers 186. The diameter of the hollow cylindrical body W2 is reduced, allowing the first finger 7a and the third finger 7c or the second finger 7b and the fourth finger 7d to abut against each other without overlaps. The first protrusion 8 and the second protrusion 9 are now formed.

According to the present embodiment, therefore, the inner circumferential wall surface of the hollow cylindrical body W2 is vertically and horizontally pressed. Because the hollow cylindrical body W2 is prevented from being deformed into a horizontally or vertically elliptical cross-sectional shape, it is possible to obtain a highly truly circular wheel rim.

Whether the end faces of the first finger 7a and the third finger 7c are spaced from each other or not can be confirmed by compressed air ejected from the air ejection ports 274 (see FIG. 19). If the end faces abut against each other with no gap defined therebetween, the compressed air is blocked by the first protrusion 8 and does not flow upwardly. Therefore, the pressure of compressed air that is monitored by the second pressure sensor in the vicinity of the first protrusion 8 is higher than the pressure of compressed air that is monitored by the first pressure sensor in the vicinity of the air ejection ports 274.

However, if the end faces of the first finger 7a and the third finger 7c are spaced from each other with a gap defined therebetween, the compressed air passes through the gap and flows upwardly. Therefore, the pressure of compressed air that is monitored by the second pressure sensor is substantially the same as the pressure of compressed air that is monitored by the first pressure sensor.

By comparing the pressures of compressed air that are monitored by the first pressure sensor and the second pressure sensor, it is possible to reliably detect whether the end faces of the first finger 7a and the third finger 7c are spaced from each other or not. If the end faces of the first finger 7a and the third finger 7c are spaced from each other with a gap defined therebetween, then the piston rod 172 may further be retracted.

When the above process is finished, the tip ends of the first finger 7a and the third finger 7c and the tip ends of the second finger 7b and the fourth finger 7d may be positionally displaced in the joining direction, as shown in FIG. 22. More-over, the end face of the hollow cylindrical body W2 near the first protrusion 8 may be spaced from the first aligning board 286 and the second aligning board 288.

Then, the aligning cylinder 188 (see FIGS. 15 and 18) is actuated to cause the piston rod 190 to retract the floating rod 192 to the right in FIGS. 15 and 18. The first large rod 198 and the second large rod 200 are now retracted, whereupon the joint member 206 and the placement joint member 218 and hence the first gripping member 238 and the aligning presser member 242 (see FIG. 19) are displaced to the right in FIGS. 15 and 19.

As described above, the aligning presser member 242 has its distal end positioned closer to the hollow cylindrical body W2 than the distal end of the first gripping member 238. Therefore, the distal end of the aligning presser member 242 initially abuts against the end face of the hollow cylindrical body W2.

The end face of the hollow cylindrical body W2 is displaced toward the first aligning board 286 and the second aligning board 288 by being pressed by the aligning presser member 242. If the first finger 7a is displaced prior to the third finger 7c, then when the end face of a portion of the hollow cylindrical body W2 which has the first finger 7a abuts against the first aligning board 286, the displacement of the end face of that portion of the hollow cylindrical body W2 is stopped. As the aligning presser member 242 is further displaced, the end face of a portion of the hollow cylindrical body W2 which has the third finger 7c finally abuts against the second aligning board 288. The displacement of the end face of the portion of the hollow cylindrical body W2 which has the third finger 7c is stopped, and the end faces of these portions of the hollow cylindrical body W2 are aligned with each other. Stated otherwise, the end faces of these portions of the hollow cylindrical body W2 lie flush with each other. When the end faces of these portions of the hollow cylindrical body W2 are aligned with each other, the displacement of the aligning presser member 242 is also stopped.

The piston rod 190 and the floating rod 192 (see FIG. 18) are continuously retracted. At this time, inasmuch as the aligning presser member 242 is pressed to a stop against the end face of the hollow cylindrical body W2, the placement joint member 218 and the aligning presser member 242 are not displaced.

The first large rod 198 and the second large rod 200 cause the bolts 234a, 234b and the hollow cylindrical covers 236a, 236b to compress the helical springs 228a, 228b housed in the casings 230a, 230b. The distance by which the helical springs 228a, 228b are compressed produces a further stroke by which the first large rod 198 and the second large rod 200 are displaced, allowing the joint member 206 and the first gripping member 238 to be further displaced.

As a result of such displacement of the first gripping member 238, the second protrusion 9 is fitted into the recess 240. Since the process of eliminating overlaps and the process of aligning the end faces have been performed as described above, the second finger 7b and the fourth finger 7d of the second protrusion 9 fitted in the recess 240 do not overlap each other, and the tip ends of the second finger 7b and the fourth finger 7d are not positionally displaced with respect to each other.

Then, the gripping cylinder 278 is actuated to cause the piston rod 280 to displace the presser board 282 and the second gripping member 268 to the left in FIGS. 15 and 18. Finally, as shown in FIG. 19, the pins 266 enter the respective curved recesses 270 defined in the second gripping member 268, and the first protrusion 8 is fitted into the recess 284. Of course, the first finger 7a and the third finger 7c of the first protrusion 8 do not overlap each other, and the tip ends of the first finger 7a and the third finger 7c are not positionally displaced with respect to each other.

As the first protrusion 8 and the second protrusion 9 are fitted respectively in the recesses 240, 284 of the second gripping member 268 and the first gripping member 238, as described above, the hollow cylindrical body W2 is gripped by the first gripping member 238 and the second gripping member 268.

Then, a pressure is applied again to the piston rods 296 (see FIGS. 14 and 16), causing the presser stops 304 to press the outer circumferential wall surface of the hollow cylindrical body W2. The hollow cylindrical body W2 is now pressed from the side of its outer circumferential wall surface by the presser stops 304, and pressed from the side of its inner circumferential wall surface by the support core 132. Stated otherwise, the hollow cylindrical body W2 is gripped by the support core 132 and the presser stops 304. Therefore, the hollow cylindrical body W2 is prevented from being opened back into a plate shape.

Then, the linear abutting regions of the hollow cylindrical body W2 are friction-stir-welded by the friction stir welding tool 100.

Prior to the friction stir welding process, cooling compressed air is ejected to the rotor 102. Specifically, the joint 316 is turned from the imaginary-line position in FIG. 14 by the rotary actuator 314 to bring the curved tip end of the cooling air outlet tube 320 into confronting relation to the rotor 102. Then, compressed air is supplied from a compressed air source, not shown, and is ejected through the air inlet tube 318, the joint 316, and the cooling air outlet tube 320 toward the rotor 102.

Then, the friction stir welding tool 100 is inserted into the gap 306 between the presser stops 304, and the rotor 102 is rotated, after which the probe 104 is brought into sliding contact with the first protrusion 8 at any desired position thereon. When the probe 104 is brought into sliding contact with the first protrusion 8, frictional heat is produced, softening the region of the first protrusion 8 that is contacted by the probe 104, whereupon the tip end of the probe 104 is plunged into the first protrusion 8.

As with the friction stir welding process performed by the friction stir welding apparatus according to the first embodiment, the central axis L1 of the probe 104 is displaced from the boundary line L2 between the end faces 1, 2 of the first protrusion 8 toward the end 2a on the advancing side. That is, the probe 104 is plunged into the abutting regions at a position displaced to the end 2a on the advancing side.

Then, while the rotor 102 is rotating, the friction stir welding tool 100 is moved toward the first protrusion 8. The material in the softened abutting regions of the hollow cylindrical body W2 is plasticized as it is stirred by the probe 104. After the probe 104 moves away, the plasticized material is cooled and solidified into a solid-state joint. This phenomenon is successively repeated to join the abutting regions of the hollow cylindrical body W2 integrally into a solid-state joint.

Since the bottom of the base 122 is slightly slanted, the hollow cylindrical body W2 is also inclined with respect to the horizontal direction. Therefore, when the friction stir welding tool 100 moves, the area of contact between the hollow cylindrical body W2 and the probe 104 is smaller than if the hollow cylindrical body W2 is supported horizontally. Consequently, the probe 104 suffers a lesser load.

When the friction stir welding tool 100 moves, it is gradually lowered by a tilting mechanism, not shown, at a rate commensurate with the gradient of the hollow cylindrical body W2. Thus, the probe 104 is prevented from being released from the hollow cylindrical body W2.

As described above, the hollow cylindrical body W2 has the first protrusion 8 and the second protrusion 9, the first protrusion 8 and the second protrusion 9 are gripped by the first gripping member 238 and the second gripping member 268, and the hollow cylindrical body W2 is gripped by the support core 132 and the presser stops 304. Therefore, the hollow cylindrical body W2 is reliably prevented from being opened back into a plate-like shape, allowing the friction stir welding process to be performed with ease.

The first finger 7a and the third finger 7c of the first protrusion 8 do not overlap each other and are not positionally displaced from each other. Of course, the second finger 7b and the fourth finger 7d of the second protrusion 9 do not overlap each other and are not positionally displaced from each other. Furthermore, since the hollow cylindrical body W2 is highly truly circular, the end faces thereof remain in abutment against each other in the vertical direction as a whole without being positionally displaced. Therefore, the above friction stir welding process makes it possible to manufacture a wheel rim having a predetermined diameter and length reliably and efficiently. That is, a wheel rim having a very good dimensional accuracy can be obtained.

Friction stir welding is capable of welding abutting regions without producing a swelling on the welded assembly and hence without the need for finishing the welded assembly. Consequently, a wheel rim that is good in appearance can be manufactured efficiently.

As the end faces suffer almost no vertical positional displacement, cavities are prevented from being produced in the joint.

While the friction stir welding process is being performed as described above, since the probe 104 is held in sliding contact with the hollow cylindrical body W2, frictional heat and machining heat are generated in the hollow cylindrical body W2. The generated heat is transferred to the support core 132.

Since the cooling water flows in the second core member 254 of the support core 132, the heat transferred through the first core member 252 to the second core member 254 is quickly removed by the cooling water. Consequently, the support core 132 is controlled not to exceed a predetermined temperature, e.g., 50° C. As the temperature of the hollow cylindrical body W2 is also prevented from rising, burrs are prevented from being formed on the hollow cylindrical body W2 in the middle of the friction stir welding process.

The probe 104 for performing the friction stir welding process is also cooled by the compressed air that is ejected from the cooling air outlet tube 320. Therefore, the rotor 102 is prevented from being thermally expanded particularly toward the outer circumferential wall surface of the hollow cylindrical body W2. Because the probe 104 is plunged to a substantially constant depth, it is possible to obtain burr-free products of good dimensional accuracy successively.

After the hollow cylindrical body W2 is friction-stir-welded, the vertically movable cylinder 294 is actuated to lower the piston rod 296 to space the presser stops 304 away from the hollow cylindrical body W2. The piston rod 280 of the gripping cylinder 278 is retracted to the right in FIG. 15, and the piston rod 190 of the aligning cylinder 188 is moved forward to the left in FIG. 15. The first protrusion 8 is spaced from the second gripping member 268, and the second protrusion 9 is spaced from the first gripping member 238. The hollow cylindrical body W2 with the first protrusion 8 and the second protrusion 9 can now be removed from the friction stir welding apparatus 120.

After the hollow cylindrical body W2 is released from the support core 132, the first protrusion 8 and the second protrusion 9 are cut off, whereupon a wheel rim of highly good dimensional accuracy is obtained.

By thus preventing the first finger 7a and the third finger 7c from overlapping each other and also preventing the second finger 7b and the fourth finger 7d from overlapping each other with the horizontal pressing cylinder 170 and also by positioning the first finger 7a and the third finger 7c and the second finger 7b and the fourth finger 7d with the aligning cylinder 188, a wheel rim of highly good dimensional accuracy can be manufactured easily and efficiently.

While the first protrusion 8 and the second protrusion 9 are being cut off, a next hollow cylindrical body W2 is set in the friction stir welding apparatus 120. The next hollow cylindrical body W2 has its inner circumferential wall surface held in abutment against the curved upper surface of the first core member 252 of the support core 132.

As described above, since the cooling water flows in the second core member 254, the temperature of the second core member 254 is prevented from rising. Consequently, when a hollow cylindrical body W2 to be friction-sir-welded next is set in the friction stir welding apparatus 120, heat is prevented from being transferred from the support core 132 to the hollow cylindrical body W2 and hence the temperature of the hollow cylindrical body W2 is prevented from increasing. As the metallic structure of the next hollow cylindrical body W2 is thus prevented from changing, the mechanical properties, such as mechanical strength, of successively manufactured wheel rims are prevented from varying.

Since the cooling water flows in the support core 132 that is held in abutment against the inner circumferential wall surface of the hollow cylindrical body W2, wheel rims of uniform quality can successively be manufactured with utmost ease.

According to the present embodiment, a preform for a wheel rim has been described as the hollow cylindrical body W2 by way of example. However, the present invention is not limited to such a preform.

The cooling medium is not limited to cooling water, but may be oil or the like.

The friction stir welding process for friction-stir-welding a workpiece by displacing the probe 104 toward the advancing side is not limited to the manufacture of the cylindrical body W2, but may be used to friction-stir-weld end faces of different members.

The friction stir welding process for friction-stir-welding end faces having burrs and sags that are produced by shearing is not limited to the manufacture of the cylindrical body W2. For friction-stir-welding end faces of different members, sags of the end faces may be held in abutment against each other, and the probe 104 may be plunged from the end faces on the side where the abutting sags are present.

Although certain preferred embodiments of the present invention has been shown and described by way of illustrative example, it is apparent that in view of the disclosure, various changes and modifications may be made therein by those skilled in the art without departing from the scope of the present invention.

The invention claimed is:

1. A method of manufacturing a hollow cylindrical body, comprising the steps of:
bending a plate material to have a substantially hollow cylindrical shape with end faces of the plate material opposing each other along a joining direction;
bringing the end faces of the plate material into abutment against each other along the joining direction;

the plate material having fingers projecting from corners along the joining direction, and pairs of said fingers form first and second protrusions projecting along the joining direction at opposite ends of the hollow cylindrical shape;

gripping said protrusions by a gripping mechanism comprising first and second gripping members such that the fingers of said protrusions are maintained in abutment along said joining direction, where each of the first and second gripping members of the gripping mechanism includes a recess which surrounds and is complementary to outer edges of an associated pair of fingers of the first or second protrusion such that the fingers cannot move apart in a direction perpendicular to the joining direction;

while the protrusions are gripped in place, friction-stir-welding abutting regions of the end faces of the plate material to join the end faces to each other, thereby forming a hollow cylindrical body having said protrusions; and removing said first and second protrusions;

wherein said end faces of the plate material are friction-stir-welded such that said abutting region is devoid of a formation of swellings.

2. A method of manufacturing a hollow cylindrical body according to claim 1, wherein said hollow cylindrical body having said protrusions is pressed from a side of an outer circumferential wall surface thereof when the abutting regions are friction-stir-welded.

3. A method of manufacturing a hollow cylindrical body according to claim 1, wherein the abutting regions are friction-stir-welded while said hollow cylindrical body is inclined with respect to a horizontal direction.

4. A method of manufacturing a hollow cylindrical body according to claim 1, wherein a wheel rim that is joined to a wheel disk to produce a vehicular wheel is manufactured as said hollow cylindrical body.

5. A method of manufacturing a hollow cylindrical body according to claim 1, wherein:

the step of said friction-stir-welding involves use of a friction stir welding tool having a probe on a tip end thereof; said probe is plunged into portions of the plate material around said end faces thereof and moved in the joining direction along the abutment between the end faces; said probe having a substantially circular cross section; and said probe is displaced from a boundary line between said end faces in a circumferential direction of said hollow cylindrical body by a predetermined distance.

6. A method of manufacturing a hollow cylindrical body according to claim 1, wherein the gripping step involves gripping only said protrusions by said gripping mechanism.

7. A method of manufacturing a hollow cylindrical body according to claim 1, wherein the plate material has upper and lower surfaces and the end faces which extend between the upper and lower surfaces in a thickness direction of the plate material.

8. A method of manufacturing a hollow cylindrical body according to claim 1, wherein the gripping mechanism includes another recess which surrounds outer edges of the pair of fingers of the first or second protrusion such that the fingers cannot move apart in a direction perpendicular to the end faces, said recesses being spaced from each other and respectively grip the pairs of fingers of the first and second protrusions during said gripping step.

9. A friction stir welding process for joining first and second metal workpiece ends together, comprising:

bringing a first end face and a second end face respectively on the first and second metal workpiece ends into abutment against each other;

gripping protrusions by a gripping mechanism comprising first and second gripping members such that the fingers of said protrusions are maintained in abutment along a joining direction, where each of the first and second gripping members of the gripping mechanism includes a recess which surrounds and is complementary to outer edges of an associated pair of fingers of the first or second protrusion such that the fingers cannot move apart in a direction perpendicular to the joining direction; and thereafter joining said first end face and said second end face to each other along a boundary line where the end faces abut with a rotating friction stir welding tool having a probe with a substantially circular cross section on a tip end thereof, wherein said first end is present on a retreating side relative to a rotating direction of said probe and said second end is present on an advancing side relative to the rotating direction of said probe, and said probe is plunged with a central region thereof being displaced from said boundary line to said second end by a predetermined distance within a range equal to or smaller than the radius of the probe;

wherein a rotational axis of said probe extends substantially parallel to a plane between said first and second end faces where said faces are brought into abutment with each other; and wherein a minimum value of displacement of said probe in said range is greater than 0.

10. A friction stir welding process according to claim 9, wherein said probe is displaced from said boundary line to said second end by a distance equal to or smaller than one-half of the radius of the probe.

11. A friction stir welding process according to claim 9, wherein a workpiece having said workpiece end with said first end face and another workpiece having said workpiece end with said second end face are separate from each other and are made of a chief component comprising the same metal.

12. A friction stir welding process according to claim 9, wherein said first end face and said second end face are on opposite ends of a single workpiece.

13. A friction stir welding process according to claim 9, wherein each of the first and second metal workpiece ends includes upper and lower surfaces, and the first and second end faces extend between the upper and lower surfaces in a thickness direction of the workpiece ends, respectively.

* * * * *